(12) United States Patent
Biddala et al.

(10) Patent No.: US 11,546,742 B2
(45) Date of Patent: Jan. 3, 2023

(54) PROGRAMMATICALLY ESTABLISHING AUTOMATED COMMUNICATIONS BETWEEN COMPUTING ENTITIES

(71) Applicant: Optum Services (Ireland) Limited, Dublin (IE)

(72) Inventors: Rajesh Biddala, County Donegal (IE); Bernard Doherty, County Donegal (IE); Peter Cogan, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 16/857,361

(22) Filed: Apr. 24, 2020

(65) Prior Publication Data

US 2021/0337364 A1    Oct. 28, 2021

(51) Int. Cl.
| | |
|---|---|
| H04M 3/00 | (2006.01) |
| H04W 4/20 | (2018.01) |
| H04W 76/10 | (2018.01) |
| H04W 4/02 | (2018.01) |

(52) U.S. Cl.
CPC ............. *H04W 4/20* (2013.01); *H04W 4/027* (2013.01); *H04W 76/10* (2018.02)

(58) Field of Classification Search
CPC ....... H04W 4/02; H04W 4/024; H04W 76/50; G08B 25/016; G08B 21/0469; G08B 21/0446; G08B 19/00; H04M 2242/04
See application file for complete search history.

(56) References Cited

U.S. PATENT DOCUMENTS

| | | | | |
|---|---|---|---|---|
| 9,449,495 | B1* | 9/2016 | Call .................... | G08B 25/08 |
| 2005/0075116 | A1* | 4/2005 | Laird .................. | A61B 5/411 |
| | | | | 455/456.3 |
| 2012/0154145 | A1* | 6/2012 | Anson ................. | G08B 25/016 |
| | | | | 340/539.13 |
| 2015/0134142 | A1* | 5/2015 | Taylor ................. | G07C 5/008 |
| | | | | 701/1 |
| 2015/0230048 | A1* | 8/2015 | Parameshwaran ..... | G01C 21/20 |
| | | | | 455/456.1 |
| 2015/0312742 | A1* | 10/2015 | Choi ................... | A61B 5/1112 |
| | | | | 455/404.2 |
| 2016/0038094 | A1* | 2/2016 | An ...................... | A61B 5/1118 |
| | | | | 600/301 |
| 2016/0345150 | A1* | 11/2016 | Shim .................... | H04W 4/90 |
| 2019/0108742 | A1* | 4/2019 | Stolbikov ............ | G08B 29/188 |
| 2020/0107176 | A1* | 4/2020 | Zavesky ............... | H04W 4/90 |

OTHER PUBLICATIONS

"SmokeBeat Smoking Cessation Monitoring 0 What Is SmokeBeat," Solutions Smokebeat—Somatix, [article], [online], (3 pages). [Retrieved from the Internet May 27, 2020] <https://somatix.com/solutions-smokebeat/>.

(Continued)

*Primary Examiner* — Shantell L Heiber
(74) *Attorney, Agent, or Firm* — Alston & Bird LLP

(57) ABSTRACT

Embodiments of the invention provide apparatuses, systems, and methods with the ability to programmatically capture different types of data and to determine whether the data satisfies one or more thresholds indicative of one or more triggering events, and responsive thereto, to automatically initiate a communication between a user and a positive user contact.

18 Claims, 17 Drawing Sheets

(56) References Cited

OTHER PUBLICATIONS

Haskins, Brianna L. et al. "A Systematic Review of Smartphone Applications for Smoking Cessation," Translational Behavioral Medicine, vol. 7, Issue 2, Jun. 2017, pp. 292-299. DOI: 10.1007/s13142-017-0492-2.

Nomura, Akihiro et al. "A Novel Smoking Cessation Smartphone App Integrated With a Mobile Carbon Monoxide Checker for Smoking Cessation Treatment: Protocol for a Randomized Controlled Trial," JMIR Research Protocols, (2019), vol. 8, Issue 2:e12252, (10 pages). DOI: 10.2196/12252.

Park, Brian. "IntelliQuit Mobile App Helps Patients, Clinicians Monitor Nicotine Use," MRP the Right Dose of Information, Jul. 22, 2019, (5 pages). [Retrieved from the Internet May 27, 2020] <https://www.empr.com/home/news/intelliquit-mobile-app-helps-patients-clinicians-monitor-nicotine-use/>.

* cited by examiner

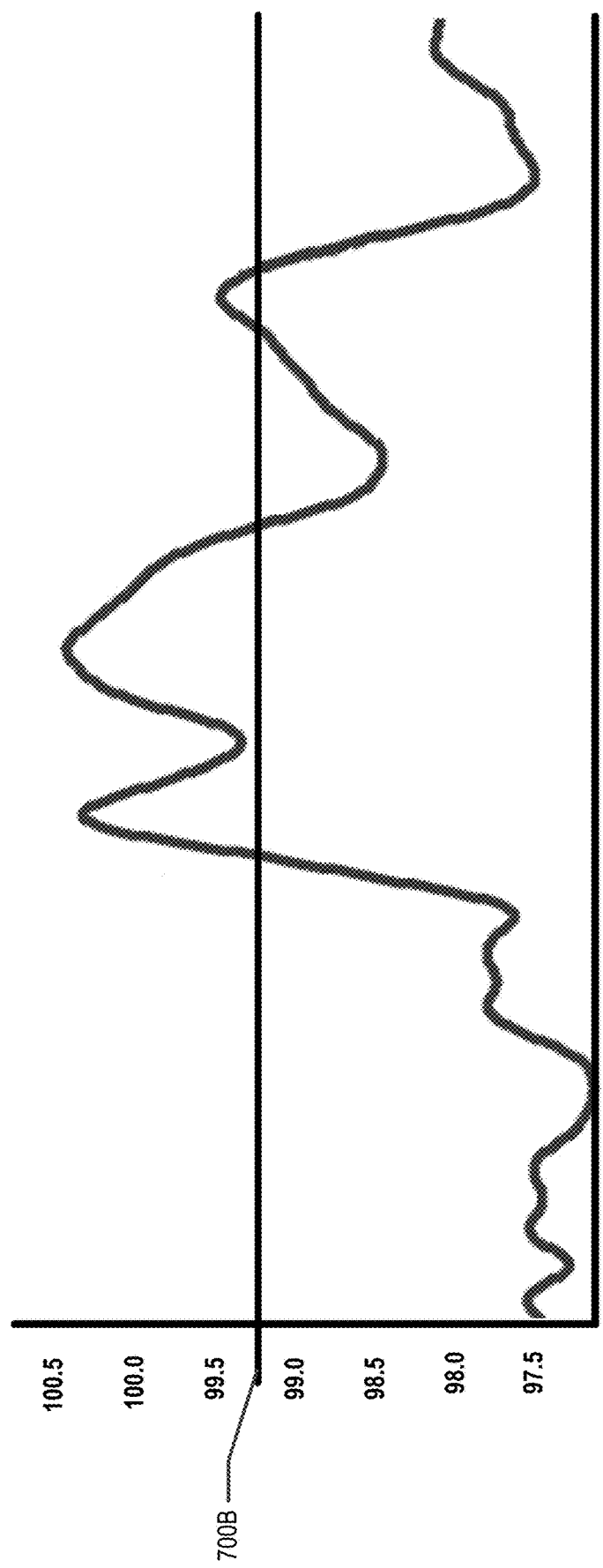

FIG. 9A

| PHYSIOLOGICAL THRESHOLDS & TRIGGERING EVENTS | |
|---|---|
| PRIMARY | PHYSIOLOGICAL DATA |
| SECONDARY | TIME DATA |
| SECONDARY | ACCELERATION DATA |
| SECONDARY | LOCATION DATA |
| SECONDARY | INTERACTION DATA |

FIG. 9B

| TIME THRESHOLDS & TRIGGERING EVENTS | |
|---|---|
| PRIMARY | TIME DATA |
| SECONDARY | PHYSIOLOGICAL DATA |

FIG. 9C

| LOCATION THRESHOLDS & TRIGGERING EVENTS | |
|---|---|
| PRIMARY | LOCATION DATA |
| SECONDARY | PHYSIOLOGICAL DATA |

FIG. 9D

| INTERACTION THRESHOLDS & TRIGGERING EVENTS | |
|---|---|
| PRIMARY | LOCATION DATA |
| SECONDARY | PHYSIOLOGICAL DATA |

PROGRAMMATICALLY ESTABLISHING AUTOMATED COMMUNICATIONS BETWEEN COMPUTING ENTITIES

BACKGROUND

Millions of people worldwide are working to overcome various forms of addiction—such as nicotine addictions, opioid addictions, and alcohol addictions. However, conventional methods are insufficient for providing such assistance. Through applied effort, ingenuity, and innovation, solutions to improve such apparatuses, systems, and methods have been realized and connection with embodiments of the present invention.

BRIEF SUMMARY

Various embodiments provide a technical solution to the technical problem of establishing automated communications.

In accordance with one aspect, a method is provided. In one embodiment, the method comprises programmatically capturing, by a user computing entity, physiological data for storage in one or more physiological data objects and accelerometer data for storage in one or more accelerometer data objects, wherein (a) the physiological data stored in the one or more physiological data objects is captured by one or more physiological components of the user computing entity, and (b) the accelerometer data stored in the one or more accelerometer data objects is captured by an accelerometer; determining, by a mobile app executing on the user computing entity, whether the physiological data stored in the one or more physiological data objects satisfies a primary physiological threshold indicating the occurrence of a primary physiological triggering event, wherein the primary physiological triggering event is associated with a time; responsive to determining that the physiological data stored in the one or more physiological data objects satisfies the primary physiological threshold, determining, by the mobile app executing on the user computing entity, whether the accelerometer data stored in the one or more accelerometer data objects satisfies a secondary accelerometer threshold indicating the occurrence of a secondary accelerometer triggering event, wherein the accelerometer data corresponds to the time associated with the primary physiological triggering event; responsive to determining that the accelerometer data stored in the one or more accelerometer data objects satisfies the secondary accelerometer threshold, automatically determining, by the mobile app executing on the user computing entity, that a first positive user contact of a plurality of positive user contacts is a first appropriate positive user contact, wherein (a) determining that the first positive user contact is the first appropriate positive user contact is based at least in part on the primary physiological triggering event or the secondary accelerometer triggering event, and (b) each positive user contact is associated with a corresponding positive user contact data object; and responsive to determining that the first positive user contact is the first appropriate positive user contact, automatically initiating, by the mobile app executing on the user computing entity, a communication via a first communication type between the user computing entity of the user and the first user computing entity of the first positive user contact.

In accordance with another aspect, a computer program product is provided. The computer program product may comprise at least one computer-readable storage medium having computer-readable program code portions of a mobile app stored therein, when executed by an apparatus, cause the apparatus to programmatically capture physiological data for storage in one or more physiological data objects and accelerometer data for storage in one or more accelerometer data objects, wherein (a) the physiological data stored in the one or more physiological data objects is captured by one or more physiological components of the user computing entity, and (b) the accelerometer data stored in the one or more accelerometer data objects is captured by an accelerometer; determine whether the physiological data stored in the one or more physiological data objects satisfies a primary physiological threshold indicating the occurrence of a primary physiological triggering event, wherein the primary physiological triggering event is associated with a time; responsive to determining that the physiological data stored in the one or more physiological data objects satisfies the primary physiological threshold, determine whether the accelerometer data stored in the one or more accelerometer data objects satisfies a secondary accelerometer threshold indicating the occurrence of a secondary accelerometer triggering event, wherein the accelerometer data corresponds to the time associated with the primary physiological triggering event; responsive to determining that the accelerometer data stored in the one or more accelerometer data objects satisfies the secondary accelerometer threshold, automatically determine that a first positive user contact of a plurality of positive user contacts is a first appropriate positive user contact, wherein (a) determining that the first positive user contact is the first appropriate positive user contact is based at least in part on the primary physiological triggering event or the secondary accelerometer triggering event, and (b) each positive user contact is associated with a corresponding positive user contact data object; and responsive to determining that the first positive user contact is the first appropriate positive user contact, automatically initiate a communication via a first communication type between the user computing entity of the user and the first user computing entity of the first positive user contact.

In accordance with yet another aspect, an apparatus comprising at least one processor and at least one memory including computer program code is provided. In one embodiment, the at least one memory and the computer program code may be configured to, with the processor, cause the apparatus to programmatically capture physiological data for storage in one or more physiological data objects and accelerometer data for storage in one or more accelerometer data objects, wherein (a) the physiological data stored in the one or more physiological data objects is captured by one or more physiological components of the user computing entity, and (b) the accelerometer data stored in the one or more accelerometer data objects is captured by an accelerometer; determine whether the physiological data stored in the one or more physiological data objects satisfies a primary physiological threshold indicating the occurrence of a primary physiological triggering event, wherein the primary physiological triggering event is associated with a time; responsive to determining that the physiological data stored in the one or more physiological data objects satisfies the primary physiological threshold, determine whether the accelerometer data stored in the one or more accelerometer data objects satisfies a secondary accelerometer threshold indicating the occurrence of a secondary accelerometer triggering event, wherein the accelerometer data corresponds to the time associated with the primary physiological triggering event; responsive to determining that the accelerometer data stored in the one or more accelerometer data objects satisfies the secondary accelerometer threshold, automatically determine that a first positive user contact of a plurality of positive user contacts is a first appropriate positive user contact, wherein (a) determining that the first positive user contact is the first appropriate positive user contact is based at least in part on the primary physiological triggering event or the secondary accelerometer triggering event, and (b) each positive user contact is associated with a corresponding positive user contact data object; and responsive to determining that the first positive user contact is the first appropriate positive user contact, automatically initiate a communication via a first communication type between the user computing entity of the user and the first user computing entity of the first positive user contact.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4A:
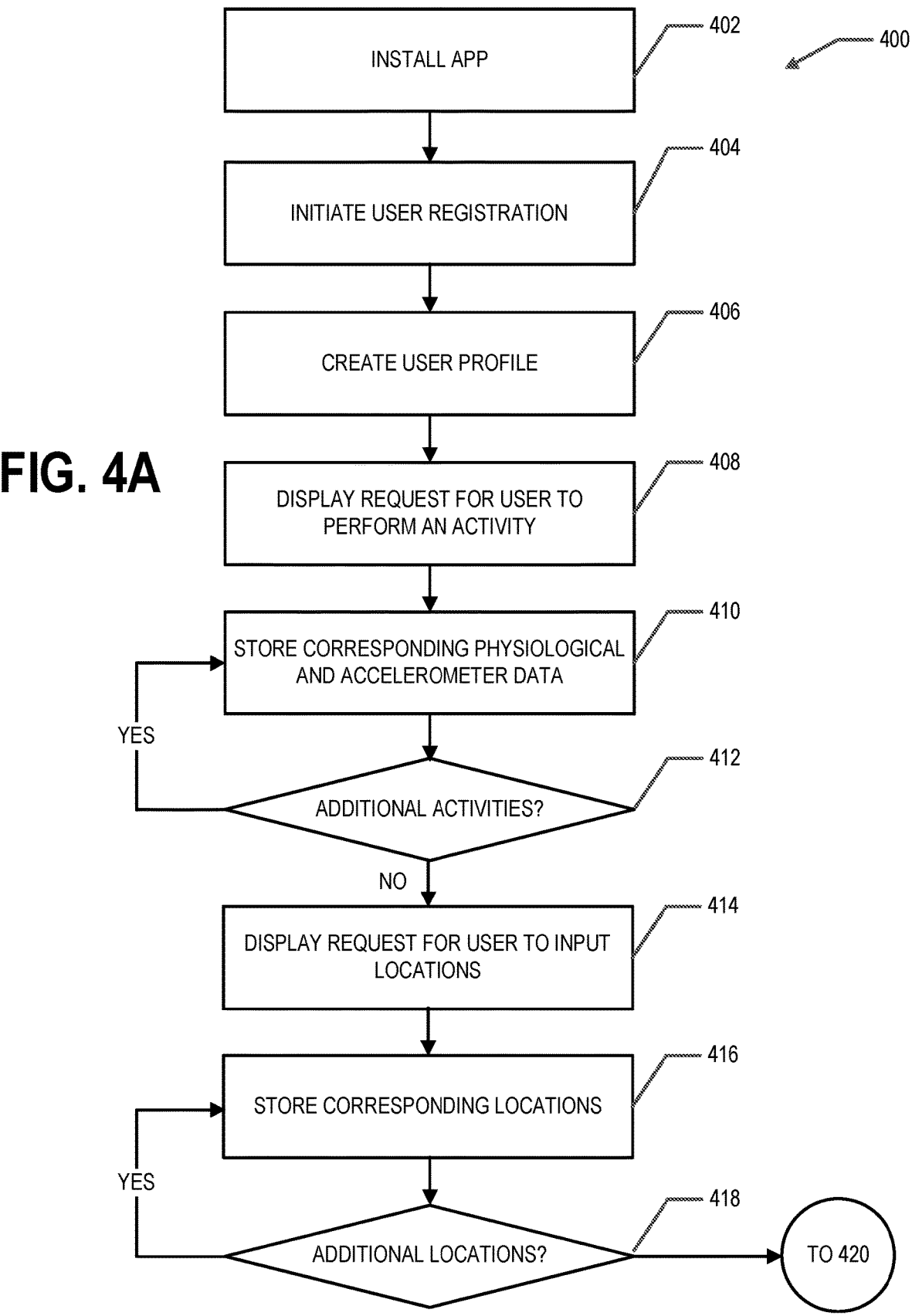
Figure 4B:
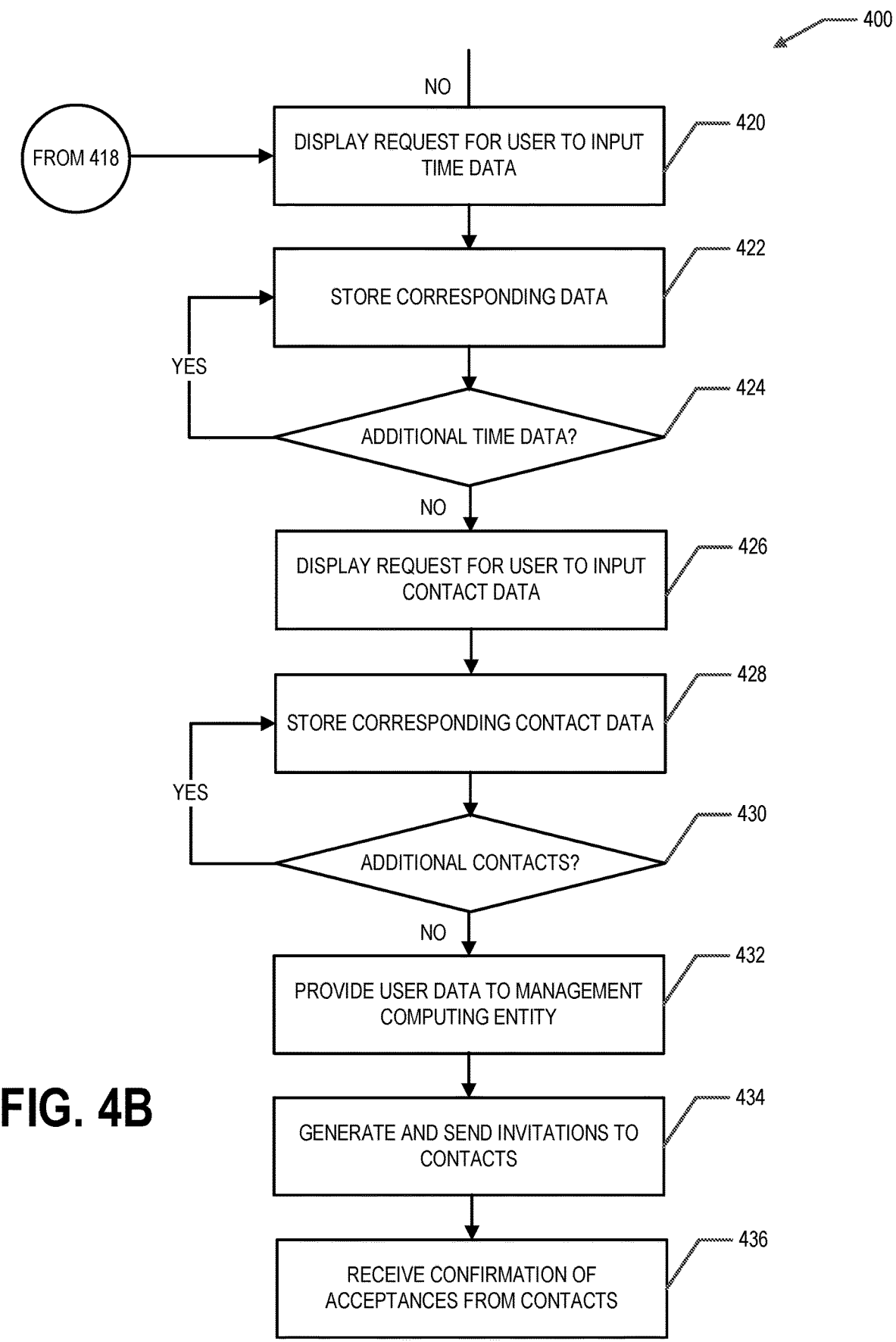
Figure 5:
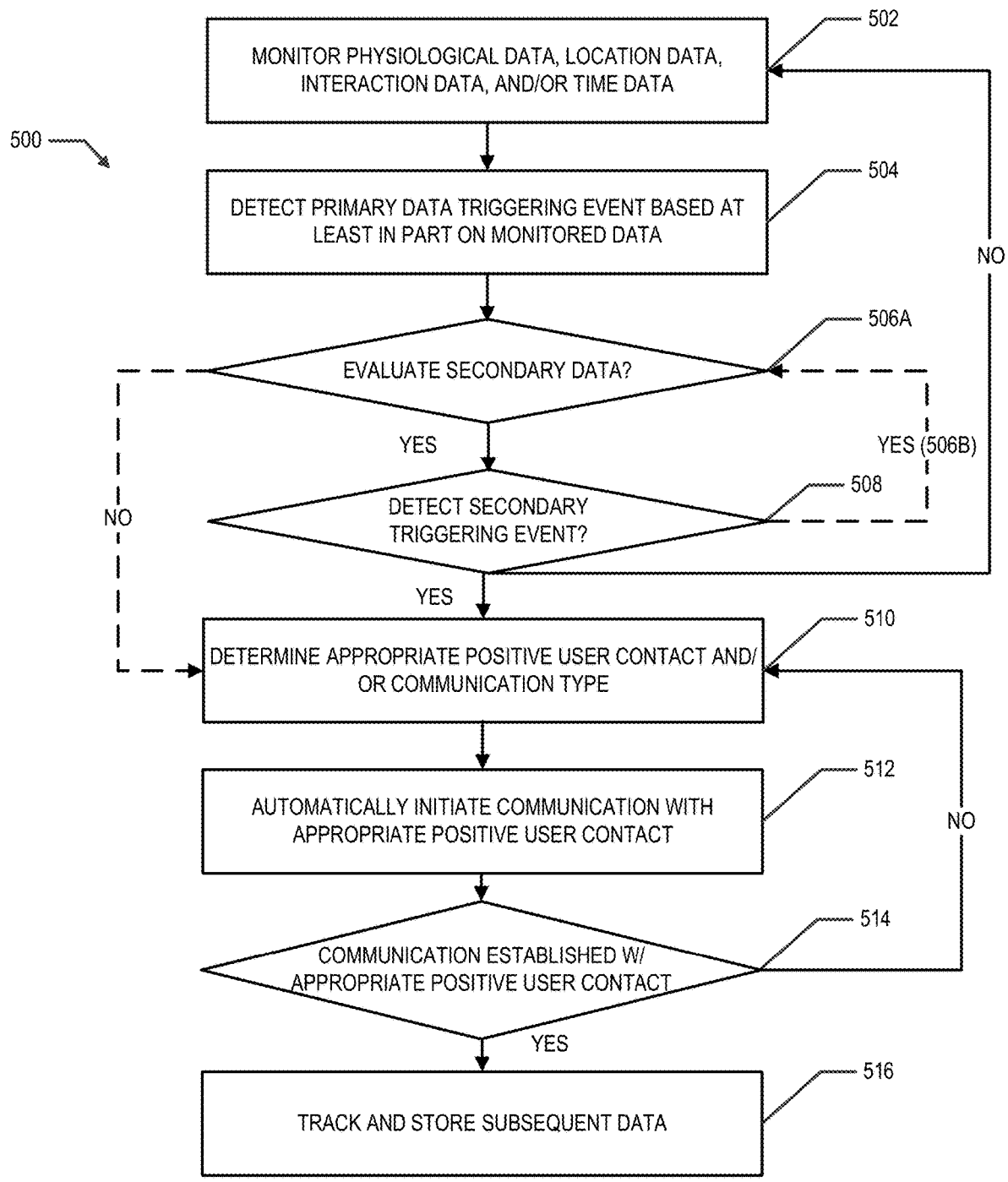
Figure 6A:
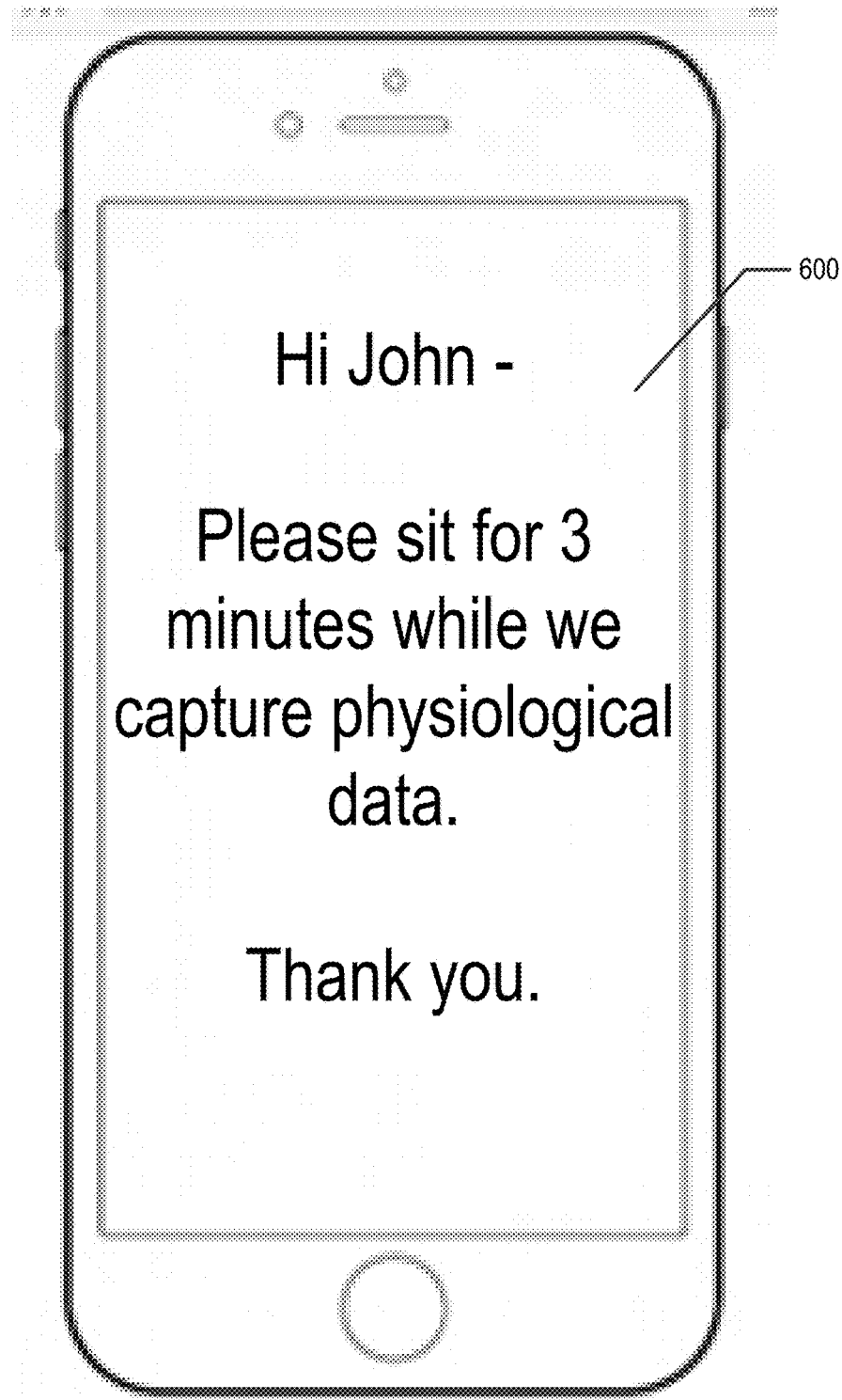
Figure 6B:
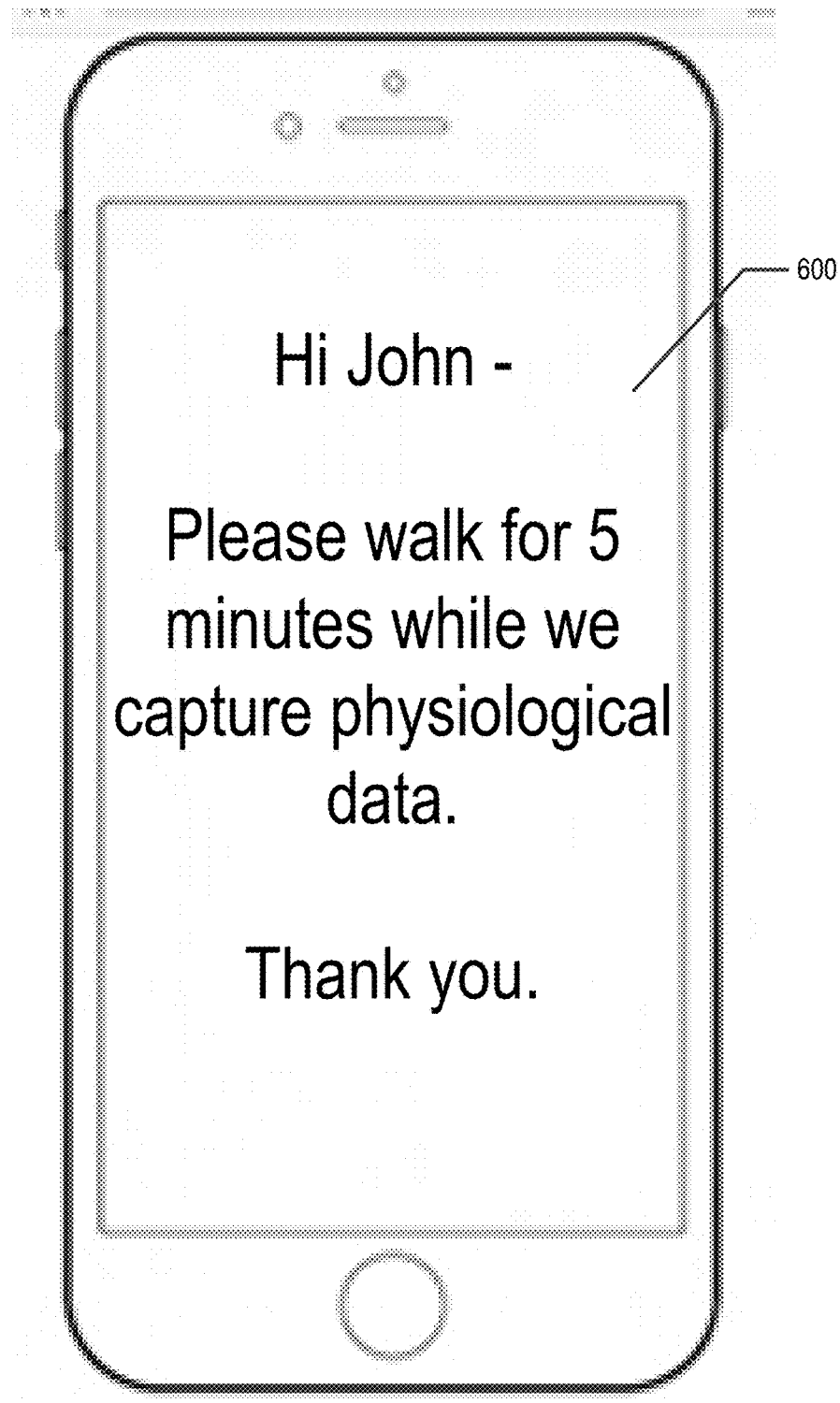
Figure 6C:
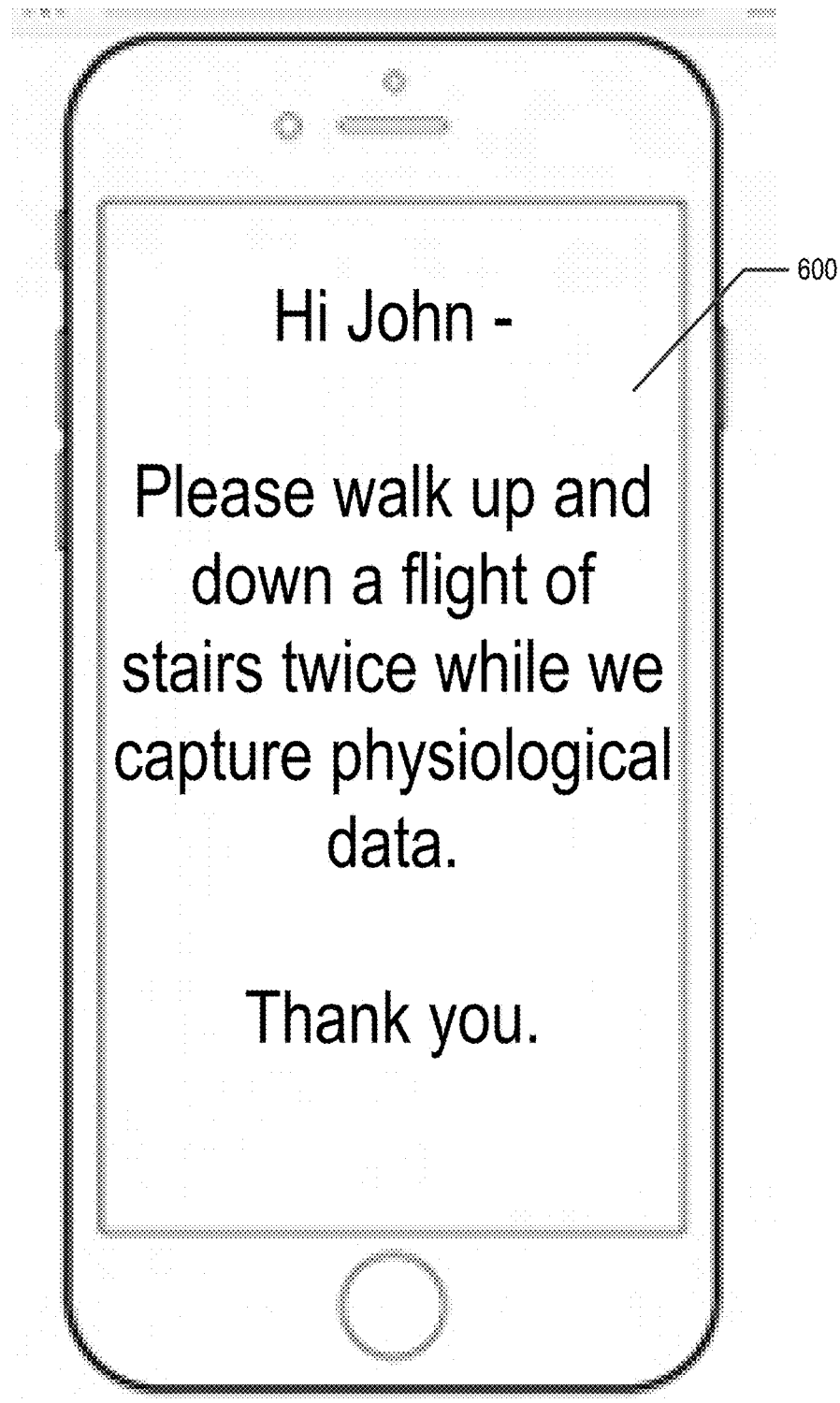
Figure 7A:
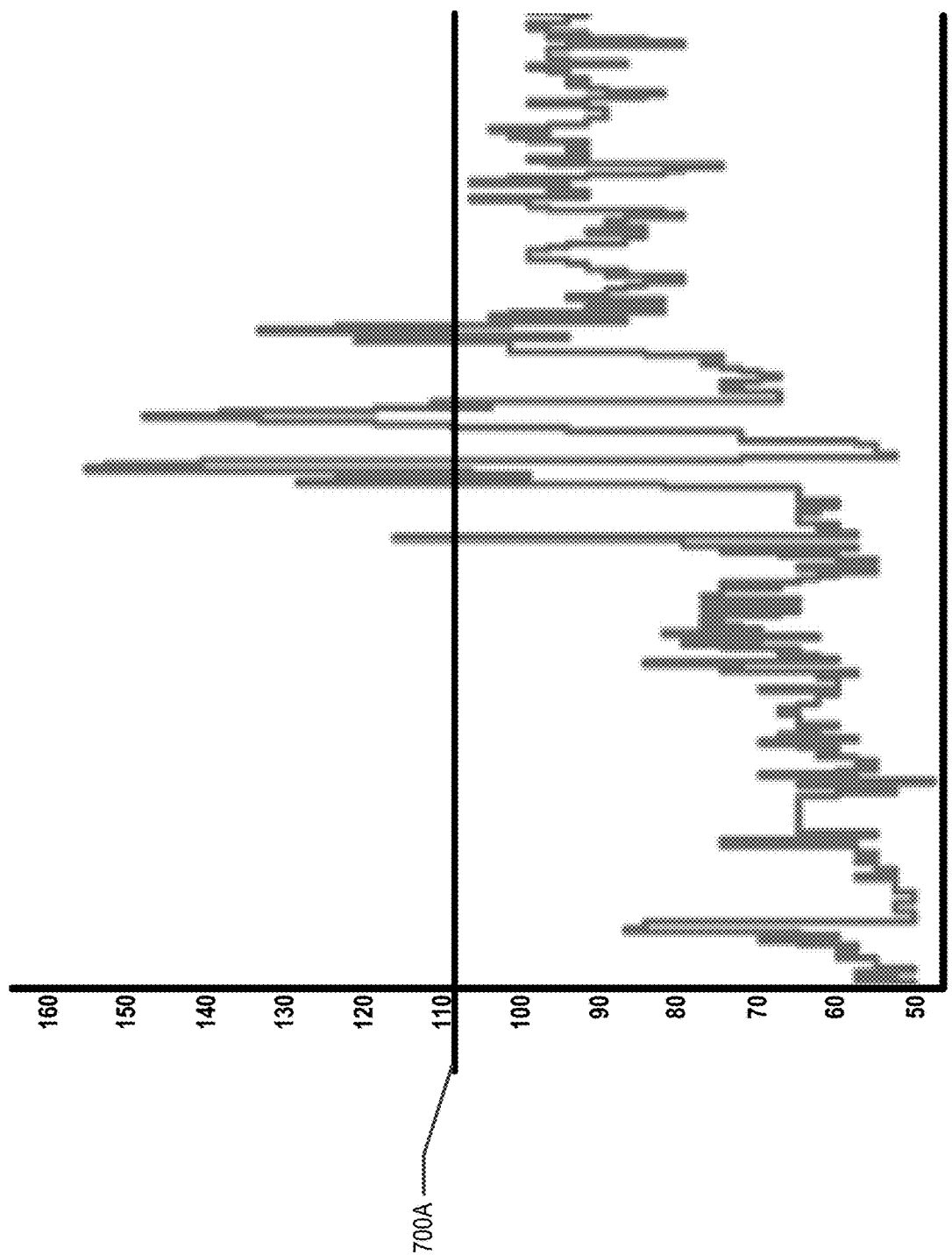
Figure 8A:
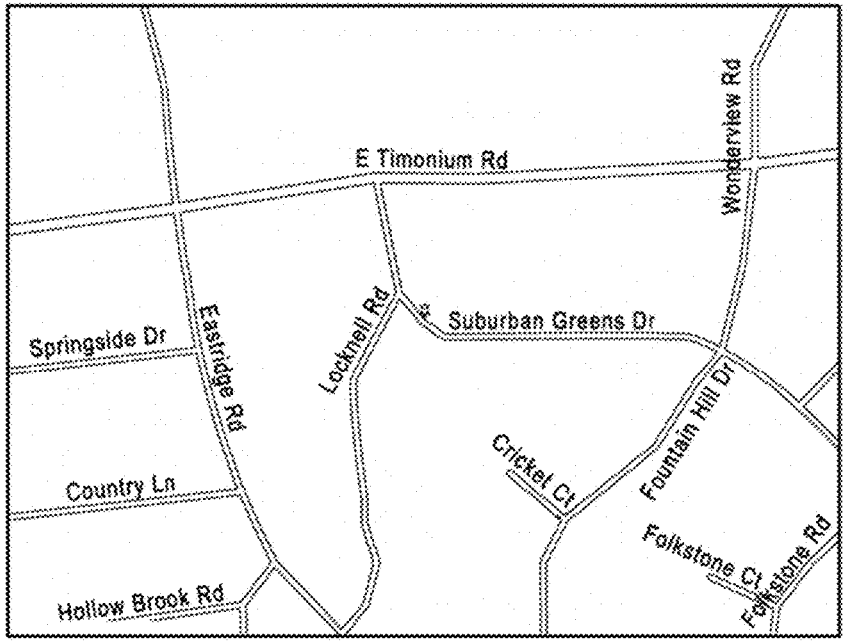
Figure 8B:
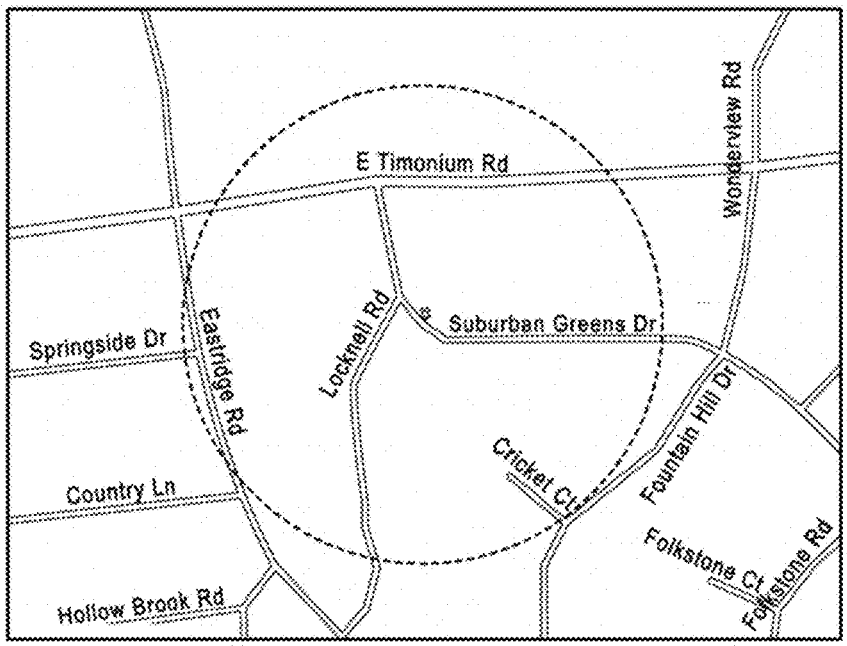
Figure 10:
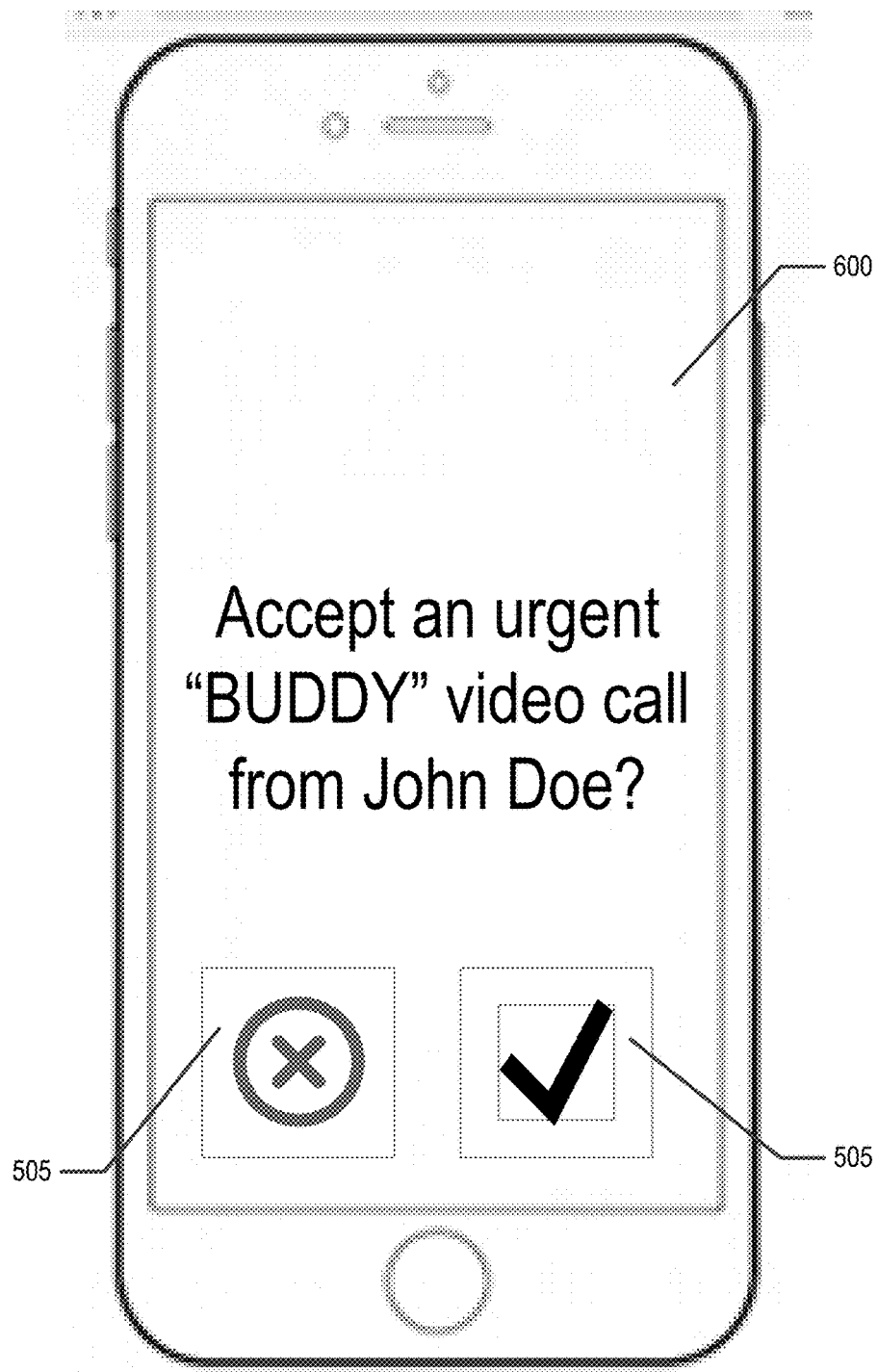
Figure 11:
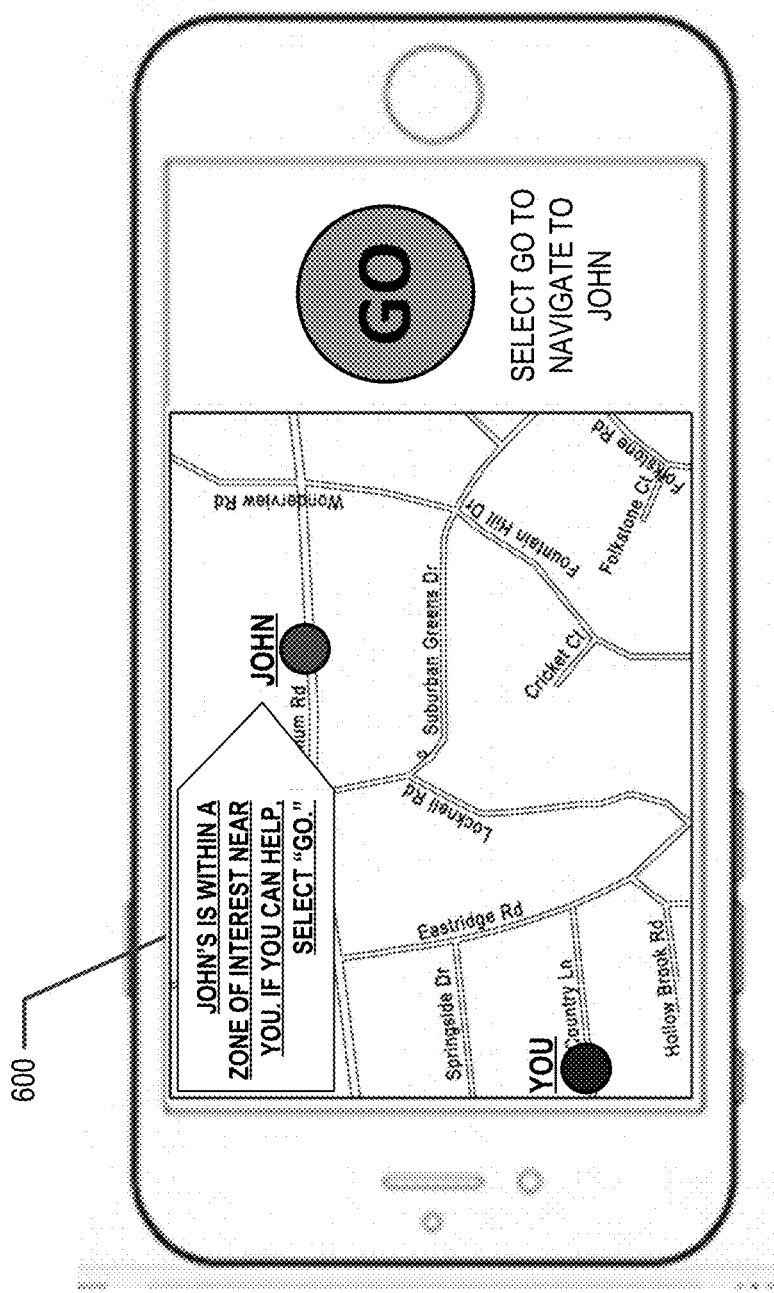
Figure 12:
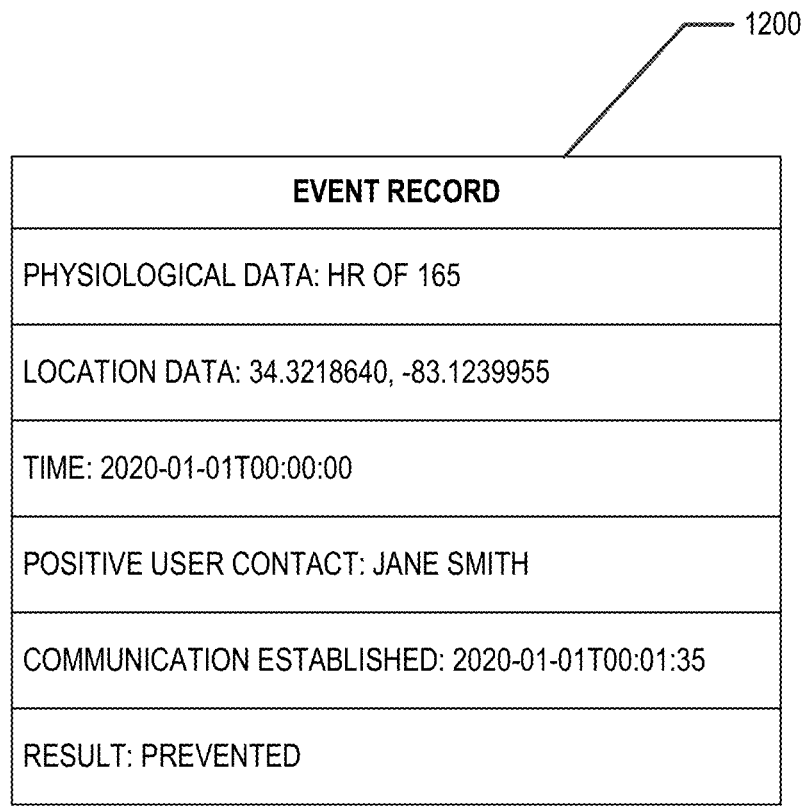
Figure 13:
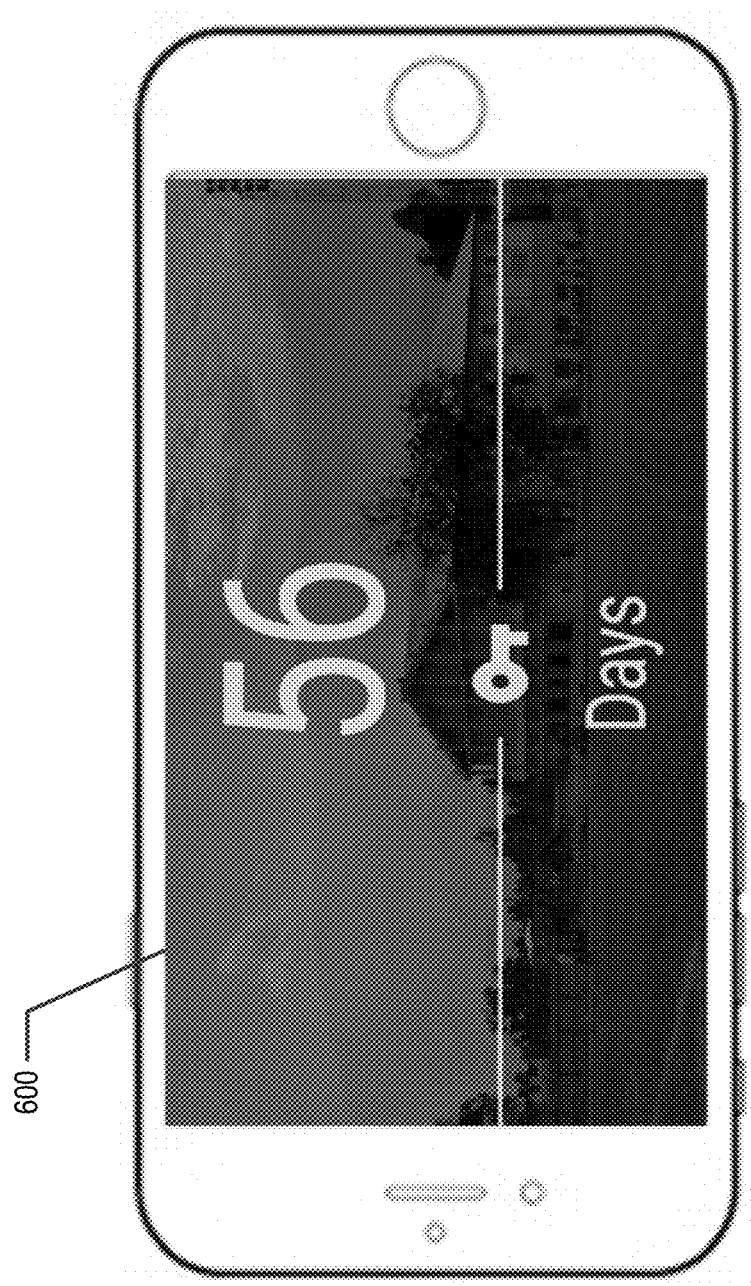

FIGS. 4A, 4B, and 5 provide flowcharts illustrating example steps, processes, procedures, and/or operations in accordance with an example embodiment of the present invention;

FIGS. 6A, 6B, and 6C provide exemplary views of a user interface, in accordance with an example embodiment of the present invention;

FIGS. 7A and 7B show graphical representations of physiological data that has been captured and stored, in accordance with an example embodiment of the present invention;

FIGS. 8A and 8B provide exemplary map views of locations and a zone of interest, in accordance with an example embodiment of the present invention;

FIGS. 9A, 9B, 9C, and 9D provide exemplary triggering event data objects that identify primary and secondary triggering events, in accordance with an example embodiment of the present invention;

FIGS. 10 and 11 provide exemplary views of a user interface, in accordance with an example embodiment of the present invention;

FIG. 12 provides an exemplary event record data object, in accordance with an example embodiment of the present invention; and FIG. 13 provides an exemplary view of a user interface, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING DEVICES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
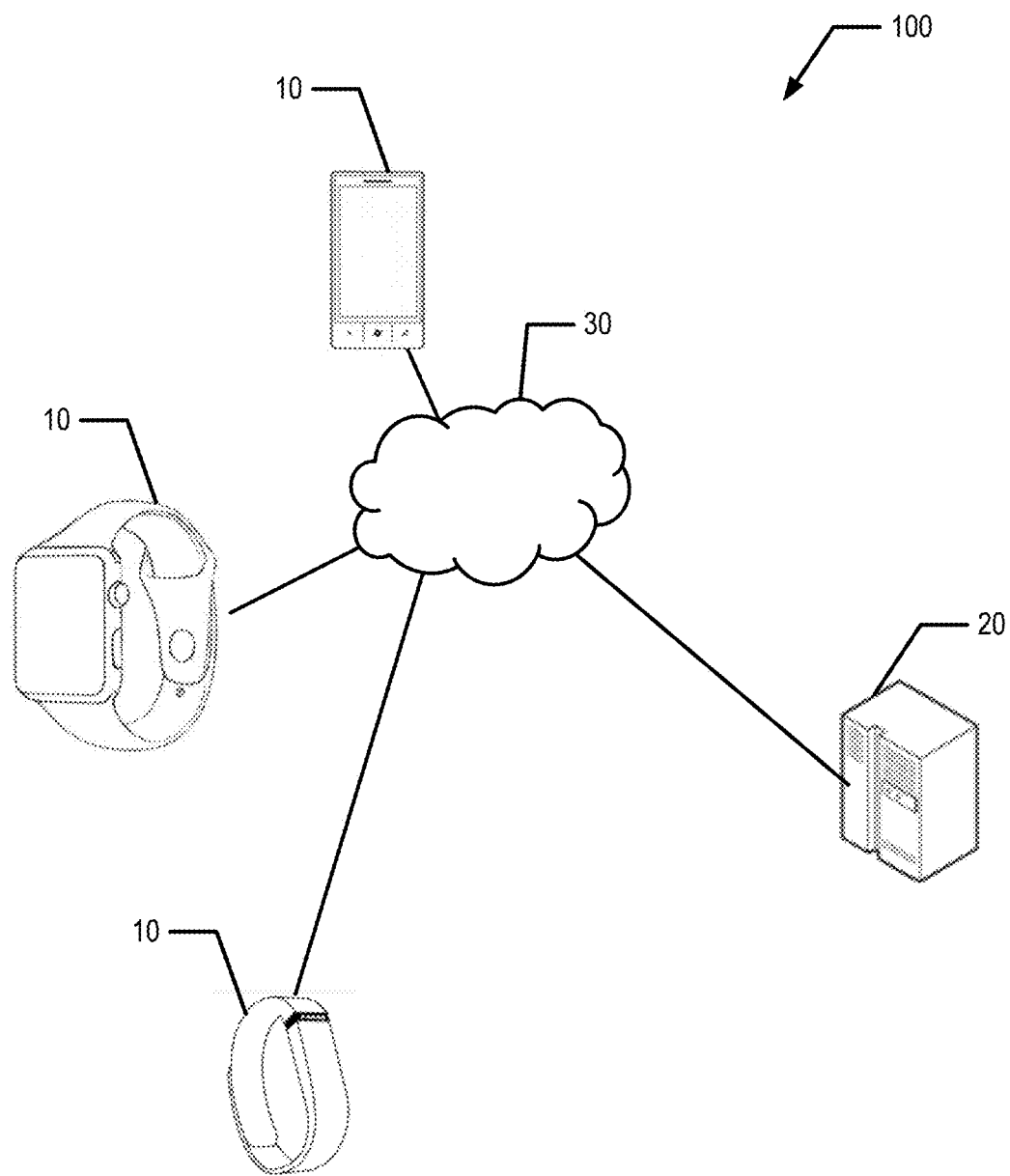
FIG. 1 is a diagram of a platform that can be used to practice various embodiments of the present invention.

FIG. 1 provides an illustration of a platform 100 that can be used in conjunction with various embodiments of the present invention. As shown in FIG. 1, the platform 100 may comprise one or more user computing entities 10, one or more management computing entities 20, one or more networks 30, and/or the like. Each of the components of the system may be in electronic communication with, for example, one another over the same or different wireless or wired networks 30 including, for example, a wired or wireless Personal Area Network (PAN), Local Area Network (LAN), Metropolitan Area Network (MAN), Wide Area Network (WAN), and/or the like. Additionally, while FIG. 1 illustrate certain system devices as separate, standalone devices, the various embodiments are not limited to this particular architecture.

Exemplary Management Computing Entity

Figure 2:
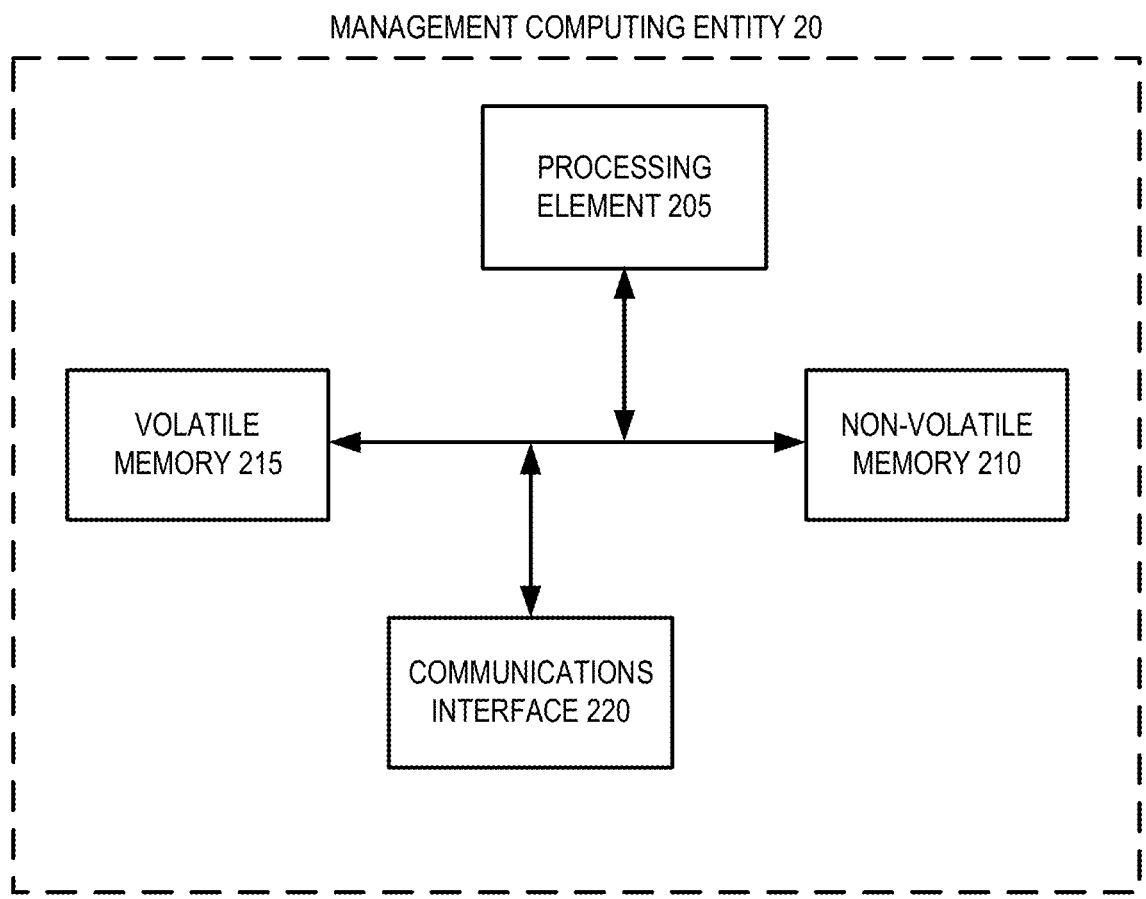
FIG. 2 is a schematic of a management computing entity in accordance with certain embodiments of the present invention.

FIG. 2 provides a schematic of a management computing entity 20 according to one embodiment of the present invention. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 20 may also include one or more network and/or communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the management computing entity 20 may include or be in communication with one or more processing elements 205 (also referred to as processors, processing circuitry, and/or similar terms used herein interchangeably) that communicate with other elements within the management computing entity 20 via a bus, for example. As will be understood, the processing element 205 may be embodied in a number of different ways. For example, the processing element 205 may be embodied as one or more complex programmable logic devices (CPLDs), microprocessors, multi-core processors, coprocessing devices, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 20 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the management computing entity 20 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the management computing entity 20 with the assistance of the processing element 205 and the operating system.

As indicated, in one embodiment, the management computing entity 20 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 20 may be configured to communicate via wireless external communication networks using any of a variety of protocols, such as general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The management computing entity 20 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the management computing entity's components may be located remotely from other management computing entity 20 components, such as in a distributed system. Furthermore, one or more of the components may be aggregated and additional components performing functions described herein may be included in the management computing entity 20. Thus, the management computing entity 20 can be adapted to accommodate a variety of needs and circumstances, such as including various components described with regard to the mobile app 600 (executing on the user computing entity 10)—including various input/output interfaces.

Exemplary User Computing Entity

Figure 3:
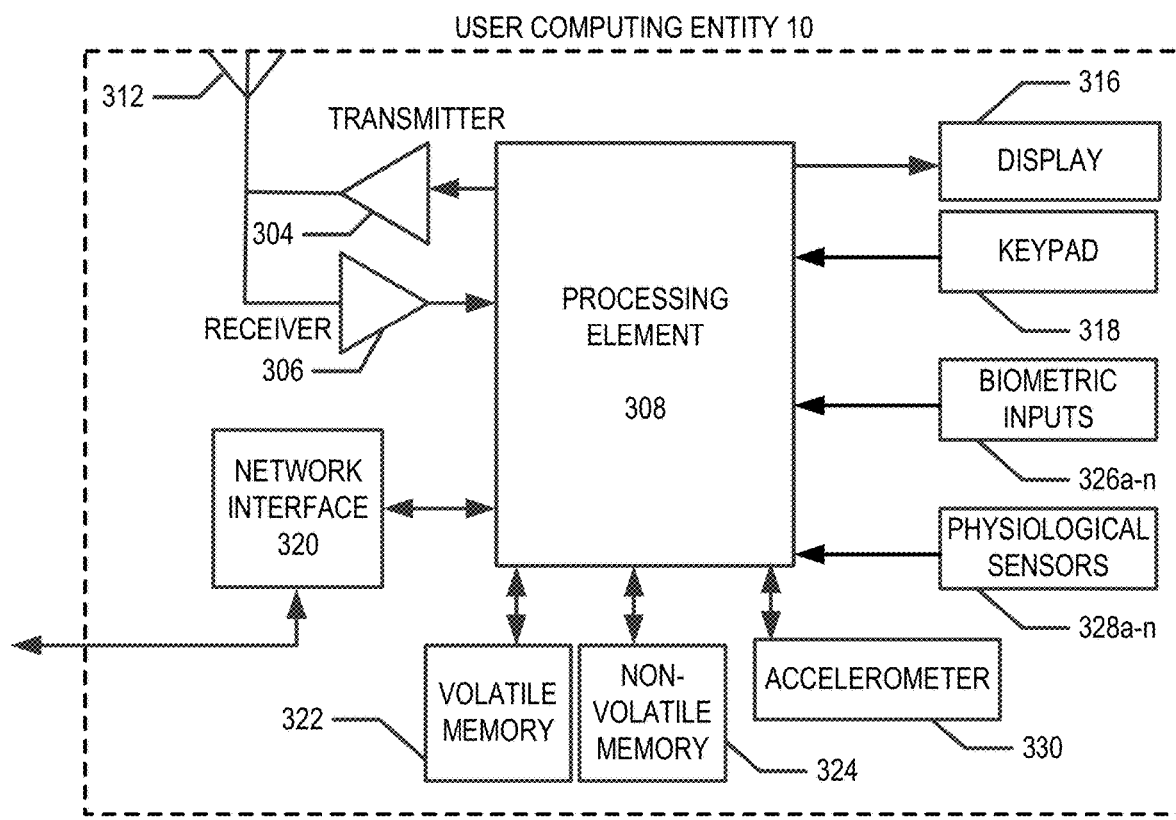
FIG. 3 is a schematic of a user computing entity in accordance with certain embodiments of the present invention.

FIG. 3 provides an illustrative schematic representative of user computing entity 10 that can be used in conjunction with embodiments of the present invention. In various embodiments, the user computing entity 10 may comprise one or more mobile devices, wearable computing devices, and/or the like. Depending on the context, a user computing entity 10 may be operated by a user, a positive user contact, a negative user contact, and/or the like.

As shown in FIG. 3, an user computing entity 10 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various devices, such as a management computing entity 20, another user computing entity 10, and/or the like. In an example embodiment, the transmitter 304 and/or receiver 306 are configured to communicate via one or more SRC protocols. For example, the transmitter 304 and/or receiver 306 may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna 312, transmitter 304, and receiver 306 may be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like.

In this regard, the user computing entity 10 may be capable of operating with one or more air interface standards, communication protocols, modulation types, and access types. More particularly, the user computing entity 10 may operate in accordance with any of a number of wireless communication standards and protocols. In a particular embodiment, the user computing entity 10 may operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 10 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 10 can also download changes, add-ons, and updates, for instance, to its firmware, software (e.g., including executable instructions, applications, program modules), and operating system.

According to one embodiment, the user computing entity 10 may include location determining aspects, devices, modules, functionalities, and/or similar words used herein interchangeably to acquire location information/data regularly, continuously, or in response to certain triggers. For example, the user computing entity 10 may include outdoor positioning aspects, such as a location module adapted to acquire, for example, latitude, longitude, altitude, geocode, course, direction, heading, speed, UTC, date, and/or various other information/data. In one embodiment, the location module can acquire information/data, sometimes known as ephemeris information/data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the apparatus's 30 position in connection with a variety of other systems, including cellular towers, Wi-Fi access points, and/or the like. Similarly, the user computing entity 10 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing entities (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The user computing entity 10 may also comprise a user interface device comprising one or more user input/output interfaces (e.g., a display 316 and/or speaker/speaker driver coupled to a processing element 308 and a touch interface, keyboard, mouse, and/or microphone coupled to a processing element 308). For example, the user interface may be configured to provide an application (e.g., mobile app), browser, interactive user interface, dashboard, webpage, and/or similar words used herein interchangeably executing on and/or accessible via the user computing entity 10 to cause display or audible presentation of information/data and for user interaction therewith via one or more user input interfaces. In one embodiment, the functionality described herein (and user interface) may be provided as a standalone app executing on the user computing entity 10. In such an implementation, the mobile app 600 may be integrated with a variety of other apps executing on the user computing entity 10 to provide authentication functionality for other apps. Moreover, the user interface can comprise or be in communication with any of a number of devices allowing the user computing entity 10 to receive information/data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 10 can capture, collect, store information/data, user interaction/input, and/or the like.

In various example embodiments, the user computing entity 10 may comprise one or more biometric input components 326a-n (e.g., sensors, elements) for receiving or capturing biometric inputs or information/data (e.g., regularly, continuously, or in response to certain triggers). For example, the user computing entity 10 may comprise a touch sensitive region and/or display for capturing fingerprint scans, in an example embodiment. In another example, the user computing entity 10 may comprise cameras and/or image capturing devices for capturing images (e.g., image information/data) of an iris and/or face to determine blink rates and skin responses. In another example, the user computing entity 10 may comprise microphones for capturing voice samples for voice recognition. As should be understood, the user computing entity 10 may comprise various biometric input components 326a-n (e.g., sensors, elements) for receiving biometric input and information/data from a user.

In another example embodiment, the user computing entity 10 may comprise one or more physiological components 328a-n (e.g., sensors, elements) for capturing physiological inputs or information/data (e.g., regularly, continuously, or in response to certain triggers). For example, the user computing entity 10 may comprise microelectromechanical (MEMS) components, biological and chemical sensing components, electrocardiogram (ECG) components, electromyogram (EMG) components, electroencephalogram (EEG)-based neural sensing components, optical sensing components, electrical sensing components, sound components, vibration sensing components, and/or the like. Through such components various types of physiological information/data can be captured—such as heart rate information/data, oxygen saturation information/data, carbon dioxide information/data, temperature information/data, breath rate information/data, perspiration information/data, neural information/data, cardiovascular sounds information/data, pulmonary sounds information/data, and/or various other types of information/data.

In another example embodiment, the user computing entity 10 may comprise one or more accelerometers, gyroscopes, and/or inertial measurement units (referred to herein separately and collectively as accelerometers 330) for capturing accelerometer information/data. For example, the accelerometers may capture static and dynamic acceleration, angular velocity, and degrees of freedom (DOF) to provide highly accurate orientation, position, and velocity information/data (e.g., accelerometer information/data).

The user computing entity 10 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 10.

Exemplary Networks

In one embodiment, any two or more of the illustrative components of the platform 100 of FIG. 1 may be configured to communicate with one another via one or more networks 30. The networks 30 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 30 may have any suitable communication range associated therewith and may include, for example, global networks (e.g., the Internet), MANs, WANs, LANs, or PANs. In addition, the networks 30 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. EXEMPLARY OPERATION

Reference will now be made to the figures. FIGS. 4A, 4B, and 5 provide flowcharts illustrating example steps, processes, procedures, and/or operations. FIGS. 6A, 6B, and 6C provide exemplary views of a user interface. FIGS. 7A and 7B show graphical representations of physiological information/data that has been captured and stored. FIGS. 8A and 8B provide exemplary map views of locations and a zone of interest. FIGS. 9A, 9B, 9C, and 9D provide exemplary triggering event data objects that identify primary and secondary triggering events. FIGS. 10 and 11 provide exemplary views of a user interface. FIG. 12 provides an exemplary event record data object. And FIG. 13 provides an exemplary view of a user interface.

Brief Overview

In one embodiment, a mobile app that allows for the monitoring of a user's physiological information/data, location information/data, interaction information/data, time information/data, and/or the like. When a primary triggering event is detected based at least in part on primary information/data, the mobile app 600 can use secondary information/data to determine whether a secondary triggering event indicates that the user should automatically be connected via a communications platform to his or her support network. In such a case the mobile app 600 can automatically connect the user with the appropriate person in his or her support network based at least in part on priority rules, proximity to the user, and availability.

User Registration

In one embodiment, a user can be registered via a mobile app 600 for use with the embodiments described herein. In most contexts described herein, a user is a person who has a desire to stop or prevent addictive activities. However, in some contexts, the user may also be a positive user contact or a negative user contact.

At step/operation 402 of FIG. 4A, a variety of sources may provide (e.g., transmit, send) a mobile app 600 for download and execution on a user computing entity 10. In another embodiment, the mobile app 600 may be preinstalled on the user computing entity 10. And in yet another embodiment, the mobile app 600 may be a browser executing on the user computing entity 10. The mobile app 600 may comprise computer-executable program code (e.g., a software application) that provides the functionality described herein.

In one embodiment, steps/operations 404 and 406 are performed as part of registering a user. For example, in one embodiment, a user profile data object for each user may be generated/created as part of registration. However, as will be recognized, a user profile may already exist and be stored in a user profile database; in such a case, registration may simply link to an existing user profile data object. Each user profile data object may be identifiable via one or more identifiers (e.g., social security numbers, patient IDs, member IDs, participant IDs, usernames, globally unique identifiers (GUIDs), universally unique identifiers (UUIDs), and/or the like) configured to uniquely identify the user profile data object. Thus, as part of enrolling/registering a user, the mobile app 600 (executing on the user computing entity 10) may request and receive various types of information/data. For example, the mobile app 600 (executing on the user computing entity 10) may request a user identifier or username. If a user profile data object corresponding to the user and associated with a user identifier already exists (e.g., is stored in a user profile database), the user information/data may comprise the user's access credentials (e.g., username, password, and/or the like). If a user profile data object corresponding to the user does not already exist, the user information/data may comprise information/data identifying the user (e.g., a username, a birthdate, and/or the like), user contact information/data (e.g., an electronic destination address, an email address, an instant messenger username, a social media username, an app username, a phone number associated with the user computing entity 10, a mailing address, and/or the like), electronic medical record (EMR) number, and/or other information/data relevant to the application (e.g., user account number, user affiliation, user title or role, and/or the like). In various embodiments, the mobile app 600 (executing on the user computing entity 10) receives the user information/data and via one or more dynamic user interfaces thereof and can provide the same to the management computing entity 20 for the generation/creation of and/or storage with a user profile data object.

Continuing with FIG. 4A, as part of enrolling/registering a user, the mobile app 600 (executing on the user computing entity 10) may iteratively request, capture, and store various types of information/data. The information/data may comprise physiological information/data, biometric information/data, accelerometer information/data, location information/data, time information/data, contact information/data, and/or the like. For example, at step/operation 408 of FIG. 4A, the mobile app 600 (e.g., executing on the user computing entity) may display a request for the user to perform one or more activities to calibrate the user's information/data. Such activities may include sitting in a chair for a predetermined amount of time, walking up and/or down flights of stairs, exercising, running, jogging, walking up or down an incline for a predetermined amount of time, and/or a variety of other activities. During the time an activity is being performed, the mobile app 600 (e.g., executing on the user computing entity) may capture and store information/data associated with the activity. For example, the mobile app 600 (e.g., executing on the user computing entity) may store physiological information/data, biometric information/data, accelerometer information/data, location information/data, time information/data, and/or the like associated with each activity in one or more labeled data objects (steps/operations 410, 412).

By way of example, FIG. 6A provides an exemplary interface of the mobile app 600 requesting the user to perform a first activity. In this example, the first activity is sitting for three minutes. In one embodiment, the user may provide some form of input via the mobile app 600 (e.g., executing on the user computing entity) to indicate that he or she is starting to perform the corresponding activity. During the configurable time period, the mobile app 600 (e.g., executing on the user computing entity) captures information/data associated with the activity. For instance, the mobile app 600 (e.g., executing on the user computing entity) can capture physiological information/data during the first activity, such as heart rate information/data, oxygen saturation information/data, temperature information/data, breath rate information/data, perspiration information/data, neural information/data, cardiovascular sounds information/data, pulmonary sounds information/data, and/or various other types of information/data. The captured physiological information/data may be stored in a labeled data object associated with the first activity. FIGS. 7A and 7B show graphical representations of physiological information/data that has been captured and stored in one or more corresponding data objects. For instance, FIG. 7A shows a graphical representation of a user's heart rate information/data over a time period. FIG. 7B shows a graphical representation of a user's body temperature information/data over a time period. As noted, in addition to capturing and storing physiological information/data, the mobile app 600 (e.g., executing on the user computing entity) may also capture and store accelerometer information/data associated with the first activity. The accelerometer information/data may include static and dynamic acceleration, velocity, angular velocity, DOF, orientation, position, and/or other information/data. The captured acceleration information/data may be stored in a labeled data object associated with the first activity. The accelerometer information/data can be used to eliminate false positives when monitoring the user. As will be recognized, various types of other information/data can be captured and stored with regard to the first activity. For instance, biometric information/data, location information/data, time information/data, and/or the like may be captured and stored with regard to the corresponding activity. The storage may be local on the user computing entity 10 (e.g., min.io), cloud-based (e.g., S3), and/or the like.

In one embodiment, the mobile app 600 can iterate through any number of activities to capture and store corresponding information/data. For instance, FIGS. 6B and 6C provide exemplary interfaces of the mobile app 600 requesting the user to perform a second activity and a third activity respectively. In these examples, the second activity is walking for five minutes, and the third activity is walking up and down a flight of stairs twice. As previously indicated, the user may provide some form of input via the mobile app 600 (e.g., executing on the user computing entity) to indicate that he or she is starting to perform the corresponding activity. As with the previous example, during the configurable time period, the mobile app 600 (e.g., executing on the user computing entity) captures information/data associated with the corresponding activity. For instance, the mobile app 600 (e.g., executing on the user computing entity) can capture physiological information/data associated with the corresponding activity. The captured physiological information/data may be stored in a labeled data object corresponding to the appropriate activity. FIGS. 7A and 7B show graphical representations of physiological information/data that has been captured and stored in one or more corresponding data objects. For instance, as noted previously, FIG. 7A shows a graphical representation of a user's heart rate information/data over a time period. And FIG. 7B shows a graphical representation of a user's body temperature information/data over a time period. In addition to capturing and storing physiological information/data, the mobile app 600 (e.g., executing on the user computing entity) may also capture and store accelerometer information/data associated with the second and third activities respectively. As will be recognized, various types of other information/data can be captured and stored with a corresponding label. Steps/operations 408, 410, and 412 can be iteratively repeated to meet a variety of needs and circumstances. The iteration of these steps/operations allow the mobile app 600 to generate/create a baseline calibration of the various types of information/data for the user.

Continuing with FIG. 4A, the mobile app 600 (executing on the user computing entity 10) may iteratively request, capture, and store location information/data for specific locations and/or zones of interest associated with the specific locations (steps/operations 414, 416, and 418 of FIG. 4A). The locations and/or zones of interest may be where the user knows of triggering events associated with an addiction are likely to occur. For example, the locations may be liquor stores, areas where narcotics are often sold, locations where the user has used narcotics before, areas where the user has purchased narcotics in the past, and/or the like. At step/operation 414 of FIG. 4A, the mobile app 600 (e.g., executing on the user computing entity) may display a request for the user to input information/data associated with such a location. Responsive to the user input, the mobile app 600 (e.g., executing on the user computing entity) may receive, retrieve, and/or store location information/data associated with the input location. For example, John Doe may input the address of 123 Suburban Greens Drive, Atlanta, Ga. 33333. As part of inputting information/data associated with the location, the mobile app 600 (executing on the user computing entity 10) can receive or determine the latitude and longitude points of the location via a query to a map database or website, by reverse geocoding, by interpolation, GPS sampling, and/or the like. In this example, the input address may be located at 34.3218697, −83.1239871. FIG. 8A provides an example of the mobile app 600 causing display of the input address. Each input location can be stored (along with its corresponding information/data) as a location data object.

In addition to requesting and receiving location information/data, the mobile app 600 (e.g., executing on the user computing entity 10) can allow the user to define one or more zones of interest (e.g., geofences and/or the like) around each location. For example, for 123 Suburban Greens Drive, Atlanta, Ga. 33333 (e.g., located at 34.3218697, −83.1239871), the mobile app 600 (executing on the user computing entity 10) can allow the user to define one or more zones of interest (e.g., geofences and/or the like) around this latitude and longitude. The zones of interest can be used to define proximities to the locations that may trigger addictive actions. Thus, the sizes, shapes, and dimensions of the zones of interest (e.g., geofences and/or the like) may vary. For example, a zone of interest may be larger for a location in a suburban area and smaller for a locations in an urban area. Continuing with the above example, assuming the 123 Suburban Greens Drive location is in a suburban area, the zone of interest may be ±0.000002, ±0.000002. However, if the location were in a more urban location, the zone of interest may be smaller: ±0.000001, ±0.000001. In other embodiments, the geofences and zones of interest may include additional location information/data, such as the altitude for office locations in high-rise buildings and/or the like. Defining the zones of interest (e.g., geofences and/or the like) may allow the user to define areas, not just specific locations, that may trigger negative addictive actions (e.g., relapse). FIG. 8B shows an exemplary zone of interest defined around the corresponding location. At least a portion of the location information/data may also be stored in a location data object. As will be recognized, a variety of other approaches and techniques can be used to adapt to various needs and circumstances. For example, zones of interest can be automatically be defined once a location is identified, e.g., using a default setting. Once the locations and/or zones of interest (e.g., geofences and/or the like) have been defined, the user's location can be automatically monitored. As will be recognized, steps/operations 414, 416, and 418 can be iteratively repeated to identify any number of locations and/or zones of interest.

Moving to FIG. 4B, the mobile app 600 (executing on the user computing entity 10) may iteratively request, capture, and store time information/data associated with times (e.g., seasons, holidays, months, weeks, days, times of day, and/or the like) when the user may be susceptible to addictive activities (e.g., periods of inactivity, early mornings, late evenings, and/or the like). At step/operation 420 of FIG. 4A, the mobile app 600 (e.g., executing on the user computing entity) may display a request for the user to input information/data associated with such times. In response, the mobile app 600 (e.g., executing on the user computing entity) may receive and/or store the corresponding input information/data (step/operation 422). Defining the time information/data may allow the user to identify times that may trigger negative addictive actions (e.g., relapse). At least a portion of the time information/data may be stored in one or more corresponding data objects. As will be recognized, steps/operations 420, 422, and 424 can be iteratively repeated to meet a variety of needs and circumstances.

Continuing with FIG. 4B, the mobile app 600 (executing on the user computing entity 10) may iteratively request, capture, and store contact information/data (steps/operations 426, 428, 430). In one embodiment, there may be two different types of user contacts. A first type of user contact may be for people who are in a position to help the user stop or prevent addictive activities, e.g., positive user contacts. Positive user contacts are typically willing to accept communications (e.g., calls) from the user at various times and engage with him or her in an effort to stop or prevent addictive activities. Thus, the contact information/data can be used to establish a communication between the user and the positive user contacts in response to one or more triggering events being detected. A second type of user contact is for people who are associated with the user's addictive activities, e.g., negative user contacts. Negative user contacts are those who the user may attempt to reach out to when he or she is trying to engaging in addictive activities, who may encourage addictive activities, and/or the like.

In one embodiment, the mobile app 600 and/or the management computing entity 20 may be capable of storing contact information/data as user contact data objects for both types of user contacts (step/operation 432). In that regard, the user contact information/data may include a label or other indicator identifying the type of user contact being input—a positive user contact or a negative user contact. Each type of contact may be associated with a different input template or form for the corresponding user contact. This may allow the mobile app 600 to request different types of information/data for positive user contacts and negative user contacts. For example, the positive user contact template or form may allow the user to indicate a priority order (e.g., based on proximity, availability, recently contacted, and/or the like) or ranking for determining when and how the corresponding positive user contact should be considered at step/operation 510. Similarly, the contact information/data for a positive user contact may include one or more types/channels of communication, such as electronic destination addresses, email addresses, instant messenger usernames, social media usernames, app usernames, phone numbers, and/or the like. The contact information/data for a positive user contact may also include a priority order or preferences for contact the positive user contact, e.g., video call, voice call, app communication, and/or the like. Similarly, the positive user contact form or template may include a selectable element that allows the mobile app 600 or the management computing entity 20 to generate and transmit a notification to the positive user contact that he or she has been indicated as a positive user contact for the user (step/operation 434). The notification may also include an invitation for the user to download, install, and/or register with the mobile app 600 (although this is not required). If downloaded and installed by a positive user contact, the mobile app 600 may request and have access to the positive user contact's calendar, mobile information/data, location information/data, and/or the like to determine the positive user contact's availability to communicate with the user and/or current location. The positive user contact may also be able to opt-in to help the user and identify preferred methods of communication and/or the like (step/operation 436). The negative user contact template or form may allow the user to identify negative user contacts in a way that will allow the mobile app 600 to determine whether a communication to a positive user contact needs to be initiated as a result of an interaction (e.g., based at least in part on interaction information/data) with a negative user contact. The user contact information/data for positive user contacts and negative user contacts may also include electronic destination addresses, email addresses, instant messenger usernames, social media usernames, app usernames, phone numbers, and/or the like. As will be recognized, various types of user contact information/data can be used to adapt to various needs and circumstances.

Automated Monitoring

In various embodiments, the different types of information/data may be used to define primary thresholds (and corresponding primary triggering events) and/or secondary triggering thresholds (and corresponding secondary triggering events). With the primary thresholds (and corresponding primary triggering events) and/or secondary triggering thresholds (and corresponding secondary triggering events) defined, the mobile app 600 (e.g., executing on the user computing entity 10) can programmatically and automatically monitor the physiological information/data, location information/data, interaction information/data, time information/data, and/or the like to detect, determine, identify, and/or the like primary triggering events and/or secondary triggering events. As has been described, the types of primary thresholds (and corresponding primary triggering events) and/or secondary triggering thresholds (and corresponding secondary triggering events) may vary to adapt to a variety of needs and circumstances. FIGS. 7A and 7B show exemplary thresholds that may be primary thresholds and/or secondary thresholds. FIGS. 9A, 9B, 9C, and 9D show exemplary primary triggering events and secondary triggering events. FIG. 5 provide flowcharts illustrating example steps, processes, procedures, and/or operations for detecting triggering primary triggering events and secondary triggering events and the corresponding automated actions.

Primary Triggering Event: Physiological Information/Data

As shown in FIG. 9A, physiological information/data can be programmatically and automatically monitored. By programmatically and automatically monitoring the physiological information/data, the mobile app 600 can detect, determine, identify, and/or the like one or more primary physiological triggering events based at least in part on the physiological information/data. To do so, one or more primary physiological thresholds can be defined. The primary physiological thresholds can be used to detect potentially addictive activities or events. For example, sudden or prolonged changes in a user's heart rate, body temperature, perspiration amount, blink rate, blood pressure, neural activity, and/or the like may be indicative of an addictive activity or event. Element 700A of FIG. 7A represents an exemplary primary physiological threshold. In this example, heart rate activity that is equal to or above the primary physiological threshold 700A may be a primary physiological triggering event. As will be recognized, heart rate activity equal to or below the primary physiological threshold may also be a primary physiological triggering event. Element 700B of FIG. 7B also represents an exemplary primary physiological threshold. In this example, body temperature that is equal to or above the primary physiological threshold 700B may be a primary physiological triggering event, and body temperature equal to or below the primary physiological threshold may similarly be a primary physiological triggering event. As will be recognized, there may be a variety primary physiological thresholds to detect increases, decreases, patterns, and/or the like in a user's physiological information/data.

At step/operation 502, the mobile app 600 (e.g., executing on a user computing entity 10) can programmatically and automatically monitor physiological information/data of a user in real-time (or near real-time) by receiving a stream of physiological information/data captured by the biometric input components 326a-n (e.g., sensors, elements) and/or physiological components 328a-n (e.g., sensors, elements). The physiological information/data can be stored as one or more physiological data objects with timestamps and/or other information/data. For example, the mobile app 600 may be executing on a standalone wearable, on both a wearable and a mobile phone paired to the wearable, on a mobile phone, and/or the like. In such configurations, the mobile app 600 may be configured to capture physiological information/data and store the same as physiological data objects.

After receiving the physiological information/data, the mobile app 600 can determine whether the physiological information/data for a user satisfies one or more primary physiological thresholds (step/operation 504). The primary physiological thresholds may be based at least in part on the user's physiological information/data that was captured as part of enrollment/registration. Such thresholds can be used to establish a baseline that is set automatically, semi-automatically, and/or manually. The thresholds may be a default configurable percentage, for example, from the baseline. Physiological information/data that satisfies at least one primary physiological threshold may be a primary physiological triggering event. For example, sudden or prolonged changes in a user's heart rate, body temperature, perspiration amount, blink rate, blood pressure, neural activity, and/or the like may satisfy one or more primary physiological thresholds and be indicative of one or more primary physiological triggering events. In FIG. 7A, heart rate activity that is equal to or above the primary physiological threshold 700A may be a primary physiological triggering event. Similarly, in FIG. 7B, body temperature that is equal to or above the primary physiological threshold 700B may be a primary physiological triggering event. Alternatively, body temperature equal to or below the primary physiological threshold may similarly be a primary physiological triggering event. While exemplary primary physiological thresholds are described with regard to FIGS. 7A and 7B, such thresholds may be adapted to meet a variety of needs and circumstances.

In one embodiment, responsive to a primary physiological triggering event having occurred, the mobile app 600 may determine whether any corresponding secondary triggering events have also occurred (steps/operations 506A, 506B, 508). The one or more secondary triggering events can be used to avoid false positive determinations that may arise if only physiological information/data were used. In that regard, accelerometer information/data, location information/data, time information/data, interaction information/data, and/or the like may be evaluated with regard to corresponding thresholds. In one embodiment, to prevent false positives, the mobile app 600 can ensure that triggering events are not overlapping for configurable time period.

As one example, if a user were to exercise, an increase in body temperature, perspiration amount, and/or heart rate (e.g., physiological information/data) would be expected. Thus, using only physiological information/data could lead to a false positive each time the user exercised. Accordingly, responsive to a primary physiological triggering event having occurred, the mobile app 600 can evaluate accelerometer information/data and/or location information/data to determine if the user is exercising (or performing other activities). The accelerometer information/data (or location information/data) can be stored as one or more accelerometer data objects (or location data objects) with timestamps and/or other information/data. The timestamps may be used to correlate the accelerometer information/data (or location information/data) with the physiological information/data. Movement indicative of exercise may be represented in the accelerometer information/data and/or the location information/data. For instance, accelerometer information/data and/or location information/data being equal to or below a secondary acceleration threshold (e.g., movement level, activity level, speed, and/or the like) may indicate that one or more secondary acceleration triggering events have occurred (e.g., that the user is exercising) or not occurred (e.g., that the user is not exercising). In this example, if the user is sitting upright in a chair with little movement as indicated by the accelerometer information/data and/or location information/data, it may indicate that the change in physiological information/data is due to the user being engaged in addictive activities. Additionally or alternatively, the accelerometer information/data and other physiological information/data may also represent one or more patterns of arm movements or body movements of the user when he or she is engaging in addictive activities, such as repeated arm movements followed by a held breath indicating that a user is smoking. Still further, the use of secondary thresholds and secondary triggering events are not limited to determining whether a user is exercising; rather, information/data may be used to determine whether other activities may be the cause of the primary physiological triggering event—such as for the stress driving in heavy traffic, the exhilaration of being on a ride at an amusement park, having an argument over the phone, and/or the like.

As another example, secondary time thresholds may be used to detect secondary time triggering events. For instance, if the user defined the time at which the primary physiological triggering event occurred as a time when he or she may be susceptible to addictive activities, the mobile app 600 may determine that the time information/data satisfies a secondary time threshold. In this example, if the user defined the time period between 1:00 am-5:00 am on Saturdays as a configurable period of time in which he or she is susceptible to addictive activities, primary physiological triggering events occurring during the corresponding configurable period of time may satisfy one or more secondary time thresholds and be secondary time triggering events. That is, the time information/data satisfying the secondary time threshold indicates that a secondary time triggering event has occurred. The time information/data may also be used in conjunction with accelerometer information/data and/or location information/data. For instance, the accelerometer information/data and/or location information/data can be used to determine whether the user is asleep—indicating that a dream is the cause the primary triggering event during the corresponding configurable period of time.

As yet another example, secondary interaction thresholds may be used to detect secondary interaction triggering events. For instance, if the user interacts with a negative user contact within a defined configurable period of time of the primary physiological triggering event occurring, the mobile app 600 may determine that the interaction information/data satisfies a secondary interaction threshold. To do so, the mobile app 600 may automatically and programmatically monitor all incoming and/or outgoing interaction information/data (e.g., received inbound calls, texts, or messages or initiated outbound calls, texts, or messages). The interaction information/data can be stored as one or more interaction data objects with timestamps and/or other information/data. The timestamps may be used to correlate the interaction information/data with the physiological information/data. In this example, if the user interacts with a negative user contact (e.g., received inbound calls, texts, or messages or initiated outbound calls, texts, or messages) within a configurable period of time (e.g., 30 seconds, two minutes, five minutes) of the primary physiological triggering event occurring, the interaction information/data may satisfy one or more secondary interaction thresholds and be secondary interaction triggering events. Such interactions may indicate that user is considering participating in addictive activities based at least in part on the physiological triggering event and the interaction triggering event.

The number of secondary thresholds and secondary triggering events for a primary physiological triggering event may vary. If used, the mobile app 600 may iterate through any number of secondary thresholds to determine if all relevant secondary triggering events have occurred (steps/operations 506A, 506B, 508). In this example, if all relevant secondary triggering events for the corresponding primary physiological triggering event have occurred, the mobile app 600 may proceed to step/operation 510 of FIG. 5. Otherwise, the mobile app 600 may return to step/operation 502. However, in another embodiment, the mobile app 600 may bypass the use of secondary thresholds and secondary triggering events (proceeding to step/operation 510) for certain primary physiological thresholds and primary physiological triggering events.

Primary Triggering Event: Time Information/Data

As shown in FIG. 9B, primary time thresholds may be used to detect primary time triggering events. For instance, if the user defined the time at which he or she may be susceptible to addictive activities, the mobile app 600 may determine that the time information/data satisfies a primary time threshold. For example, if the user defined the time period between 1:00 am-5:00 am on Saturdays as a configurable period of time in which he or she is susceptible to addictive activities, the time information/data may be a primary time triggering event. That is, the time information/data satisfying the primary time threshold indicates that a primary time triggering event has occurred (step/operation 504).

In one embodiment, responsive to a primary time triggering event having occurred, the mobile app 600 may determine whether any corresponding secondary triggering events have also occurred (steps/operations 506A, 506B, 508). The one or more secondary triggering events can be used to avoid false positive determinations that may arise if only time information/data were used. In that regard, accelerometer information/data, location information/data, physiological information/data, interaction information/data, and/or the like may be evaluated with regard to corresponding thresholds.

As one example, the mobile app 600 can evaluate location information/data to determine if the user is walking or driving toward a defined location or zone of interest during the configurable period of time. For instance, a regular or continuous stream of location information/data can be used to determine the user's location, direction, heading, speed, route, and/or the like. The location information/data can be stored as one or more location data objects with timestamps and/or other information/data. The timestamps may be used to correlate the location information/data with the time information/data. In this example, if the mobile app 600 determines that the user is traveling toward a defined location or zone of interest, a secondary location threshold may be satisfied indicating that a secondary location triggering event has occurred.

As another example, secondary interaction thresholds may be used to detect secondary interaction triggering events. For instance, if the user interacts with a negative user contact within a defined configurable period of time of the primary time triggering event occurring, the mobile app 600 may determine that the interaction information/data satisfies a secondary interaction threshold. To do so, the mobile app 600 may automatically and programmatically monitor all incoming and/or outgoing interaction information/data (e.g., received inbound calls, texts, or messages or initiated outbound calls, texts, or messages). The interaction information/data can be stored as one or more interaction data objects with timestamps and/or other information/data. The timestamps may be used to correlate the interaction information/data with the time information/data. In this example, if the user interacts with a negative user contact (e.g., received inbound calls, texts, or messages or initiated outbound calls, texts, or messages) within a configurable period of time (e.g., 30 seconds, two minutes, five minutes) of the primary time triggering event occurring, the interaction information/data may satisfy one or more secondary interaction thresholds and be secondary interaction triggering events.

The number of secondary thresholds and secondary triggering events for a primary time triggering event may vary. If used, the mobile app 600 may iterate through any number of secondary thresholds to determine if all relevant secondary triggering events have occurred (steps/operations 506A, 506B, 508). In this example, if all relevant secondary triggering events for the corresponding primary time triggering event have occurred, the mobile app 600 may proceed to step/operation 510 of FIG. 5. Otherwise, the mobile app 600 may return to step/operation 502. However, in another embodiment, the mobile app 600 may bypass the use of secondary thresholds and secondary triggering events (proceeding to step/operation 510) for certain primary time thresholds and primary time triggering events.

Primary Triggering Event: Location Information/Data

As shown in FIG. 9C, primary location thresholds may be used to detect primary location triggering events. For instance, the mobile app 600 can evaluate location information/data to determine if the user is traveling to or near a defined location or is within a zone of interest. For instance, a regular or continuous stream of location information/data can be used to determine the user's location, direction, heading, speed, route, and/or the like. The location information/data can be stored as one or more location data objects with timestamps and/or other information/data. In this example, the zone of interest can be used to define a distance, range, proximity, geofence, tolerance, and/or similar words used herein interchangeably with regard to a particular location. For example, in one embodiment, the zone of interest may be plus or minus (±) a specific distance or range using a coordinate system (e.g., DD, DMS, UTM). As will be recognized, a zone of interest may be in a variety of formats, such as degrees, minutes, seconds, feet, meters, miles (e.g., 3, 15, 30, or 50 feet), kilometers, and/or the like. Continuing with the above example, the mobile app 600 may determine that a primary location threshold is satisfied and a primary location triggering event has occurred when the user is at a location or within a defined zone of interest.

In one embodiment, responsive to a primary time triggering event having occurred, the mobile app 600 may determine whether any corresponding secondary triggering events have also occurred (steps/operations 506A, 506B, 508). As one example, secondary physiological thresholds may be used to detect secondary physiological triggering events. The physiological information/data can be stored as one or more accelerometer data objects with timestamps and/or other information/data. The timestamps may be used to correlate the physiological information/data with the location information/data. Physiological information/data that satisfies at least one secondary physiological threshold may be a secondary physiological triggering event. For example, sudden or prolonged changes in a user's heart rate, body temperature, perspiration amount, blink rate, blood pressure, neural activity, and/or the like may satisfy one or more secondary physiological thresholds and be indicative of one or more secondary physiological triggering events. The number of secondary thresholds and secondary triggering events for a primary location triggering event may vary. If used, the mobile app 600 may iterate through any number of secondary thresholds to determine if all relevant secondary triggering events have occurred (steps/operations 506A, 506B, 508). In this example, if all relevant secondary triggering events for the corresponding primary location triggering event have occurred, the mobile app 600 may proceed to step/operation 510 of FIG. 5. Otherwise, the mobile app 600 may return to step/operation 502.

In another embodiment, the mobile app 600 may bypass the use of secondary thresholds and secondary triggering events (proceeding to step/operation 510) for certain primary location thresholds and primary location triggering events. In some cases, location information/data may be more indicative of addictive activities than other types of information/data.

Primary Triggering Event: Interaction Information/Data

As shown in FIG. 9C, primary interaction thresholds may be used to detect primary interaction triggering events. For instance, if the user interacts with a negative user contact, the mobile app 600 may determine that the interaction information/data satisfies a primary interaction threshold. To do so, the mobile app 600 may automatically and programmatically monitor all incoming and/or outgoing interaction information/data (e.g., received inbound calls, texts, or messages or initiated outbound calls, texts, or messages). The interaction information/data can be stored as one or more interaction data objects with timestamps and/or other information/data. In this example, if the user interacts with a negative user contact (e.g., received inbound calls, texts, or messages or initiated outbound calls, texts, or messages), the interaction information/data may satisfy one or more primary interaction thresholds and be indicative of one or more primary interaction triggering events. That is, the interaction information/data satisfying the primary interaction threshold indicates that a primary interaction triggering event has occurred (step/operation 504).

In one embodiment, responsive to a primary interaction triggering event having occurred, the mobile app 600 may determine whether any corresponding secondary triggering events have also occurred (steps/operations 506A, 506B, 508). The one or more secondary triggering events can be used to avoid false positive determinations that may arise if only time information/data were used. In that regard, accelerometer information/data, location information/data, physiological information/data, and/or the like may be evaluated with regard to corresponding thresholds.

As one example, the mobile app 600 can evaluate location information/data to determine if the user is walking or driving toward a defined location or zone of interest within a configurable period of time after interacting with a negative user contact. For instance, a regular or continuous stream of location information/data can be used to determine the user's location, direction, heading, speed, route, and/or the like. The location information/data can be stored as one or more location data objects with timestamps and/or other information/data. The timestamps may be used to correlate the location information/data with the interaction information/data. In this example, if the mobile app 600 determines that the user is traveling toward a defined location or zone of interest within a configurable period of time after interacting with a negative user contact, a secondary location threshold may be satisfied indicating that a secondary location triggering event has occurred.

As another example, secondary physiological thresholds may be used to detect secondary physiological triggering events. The physiological information/data can be stored as one or more interaction data objects with timestamps and/or other information/data. The timestamps may be used to correlate the physiological information/data with the interaction information/data. Physiological information/data that satisfies at least one secondary physiological threshold may be a secondary physiological triggering event. For example, sudden or prolonged changes in a user's heart rate, body temperature, perspiration amount, blink rate, blood pressure, neural activity, and/or the like during or after interacting with a negative user contact may satisfy one or more secondary physiological thresholds and be indicative of one or more secondary physiological triggering events.

The number of secondary thresholds and secondary triggering events for a primary interaction triggering event may vary. If used, the mobile app 600 may iterate through any number of secondary thresholds to determine if all relevant secondary triggering events have occurred (steps/operations 506A, 506B, 508). In this example, if all relevant secondary triggering events for the corresponding primary time triggering event have occurred, the mobile app 600 may proceed to step/operation 510 of FIG. 5. Otherwise, the mobile app 600 may return to step/operation 502. However, in another embodiment, the mobile app 600 may bypass the use of secondary thresholds and secondary triggering events (proceeding to step/operation 510) for certain primary time thresholds and primary time triggering events.

Automated Communications

In one embodiment, with a primary triggering event having occurred and any applicable secondary triggering events, the mobile app 600 proceeds to step/operation 510 of FIG. 5. At step/operation 510, the mobile app determines the "appropriate" positive user contact with whom an automatic communication should be initiated and/or established. The contact information/data for a positive user contact may include one or more types/channels of communication, such as electronic destination addresses, email addresses, instant messenger usernames, social media usernames, app usernames, phone numbers, and/or the like. Thus, the automatic communication can be through any of such communication types/channels (e.g., video call, voice call, app communication, and/or the like) based at least in part on the contact information/data and/or any users preferences.

As described previously, the user can input any number of positive user contacts via the mobile app 600 to be stored as user contact data objects. Positive user contacts are typically willing to accept communications (e.g., calls) from the user at various times and engage with him or her in an effort to stop or prevent addictive activities. Thus, the contact information/data for a positive user contact can be used to establish a communication between the user and the positive user contacts. The positive user contact information/data for each positive user contact may indicate a priority order or ranking for determining when and how the corresponding positive user contact should be considered at step/operation 510.

In one example, to determine the appropriate positive user contact, the positive user contacts may include a simple ranking of 1–n. In this example, an appropriate computing entity (e.g., the user computing entity 10 of the user, the user computing entity 10 of the positive user contact, or the management computing entity 20) can initiate a communication between the user and the corresponding positive user contact based at least in part on the ranking until a communication is successfully established. For instance, an appropriate computing entity (e.g., the user computing entity 10 of the user, the user computing entity 10 of the positive user contact, or the management computing entity 20) can iterate through each positive user contact based at least in part on the 1–n ranking initiating communications until one is successfully established (steps/operations 512, 514)—such as establishing a voice call (e.g., via phone numbers); a FaceTime or Google Chat video call; a Teams, Zoom, or Webex voice or video interaction; a map-based communication; and/or the like.

Alternatively, to determine the appropriate positive user contact, the availability of each user's positive user contact may be used, in addition to the ranking 1–n. For example, if each positive user contact has downloaded and installed the mobile app 600, the mobile app 600 of each positive user contact can provide the corresponding availability to the mobile app 600 of the user. Such availability may be determined based at least in part on the positive user contact's calendar (e.g., indicating unavailable when appointments are listed on the calendar), whether the positive user contact is on a call, where the positive user contact is located (e.g., traveling in a time zone that is 12 hours different from that of the user), has "do not disturb" active, and/or the like. The availability can be provided regularly, continuously, or in response to certain triggers. Thus, with the availability for each positive user contact 1–n, an appropriate computing entity (e.g., the user computing entity 10 of the user, the user computing entity 10 of the positive user contact, or the management computing entity 20) can initiate a communication with the positive user contact based at least in part on both the availability and the ranking 1–n. Then, an appropriate computing entity (e.g., the user computing entity 10 of the user, the user computing entity 10 of the positive user contact, or the management computing entity 20) can iterate through the available positive user contacts ranked 1–n initiating communications until a communication is successfully established.

In another example, to determine the appropriate positive user contact, the positive user contacts may be associated with particular types of primary triggering events and/or particular types of secondary triggering events. Similarly, the positive user contacts may be associated with locations of primary triggering events and/or locations of secondary triggering events. For example, Jane Smith may be a positive user contact who lives near a zone of interest. In such a case, Jane may be identified as the initial positive user contact for primary location triggering events for a zone of interest near where she lives. In this example, an appropriate computing entity (e.g., the user computing entity 10 of the user, the user computing entity 10 of the positive user contact, or the management computing entity 20) can initiate a communication between the user and Jane Smith first and continue to iterate through the positive user contacts (and/or communication types/channels) until a communication successfully established (steps/operations 512, 514)—such as establishing a voice call (e.g., via phone numbers); a FaceTime or Google Chat video call; a Teams, Zoom, or Webex voice or video interaction; a map-based communication; and/or the like.

In yet another example, to determine the appropriate positive user contact, the positive user contacts may be associated with particular time periods of primary triggering events and/or particular time periods of secondary triggering events. For instance, John Smith may be a positive user contact who works the night shift. In such a case, John may be listed as the initial positive user contact for events occurring from 1:00 am to 5:00 am. In this example, an appropriate computing entity (e.g., the user computing entity 10 of the user, the user computing entity 10 of the positive user contact, or the management computing entity 20) can attempt to establish a communication between the user and John first and continue to iterate through the positive user contacts (and/or communication types/channels) until a communication successfully established (steps/operations 512, 514)—such as establishing a voice call (e.g., via phone numbers); a FaceTime or Google Chat video call; a Teams, Zoom, or Webex voice or video interaction; a map-based communication; and/or the like. As will be recognized, determining the appropriate positive user contact may include other embodiments and combinations of those described.

In yet another example, to determine the appropriate positive user contact, the locations of the positive user contacts with regard to the user may be determined. For instance, in response to primary triggering events and/or secondary triggering events, the location of one or more positive user contacts can be dynamically determined. For example, if each positive user contact has downloaded and installed the mobile app 600, the mobile app 600 of each positive user contact can provide the corresponding location information/data to the mobile app 600 of the user. The location information/data can be provided regularly, continuously, or in response to certain triggers (e.g., triggering events). Thus, with the location for each positive user contact, an appropriate computing entity (e.g., the user computing entity 10 of the user, the user computing entity 10 of the positive user contact, or the management computing entity 20) can initiate a communication with the positive user contact based at least in part on location—such as initiating a communication with the nearest positive user contact. Then, an appropriate computing entity (e.g., the user computing entity 10 of the user, the user computing entity 10 of the positive user contact, or the management computing entity 20) can iterate through the positive user contacts based on location (in order from nearest to farthest) until a communication is successfully established.

John Smith may be a positive user contact who works the night shift. In such a case, John may be listed as the initial positive user contact for events occurring from 1:00 am to 5:00 am. In this example, an appropriate computing entity (e.g., the user computing entity 10 of the user, the user computing entity 10 of the positive user contact, or the management computing entity 20) can initiate a communication between the user and John first and continue to iterate through the positive user contacts (and/or communication types/channels) until a communication successfully established (steps/operations 512, 514)—such as establishing a voice call (e.g., via phone numbers); a FaceTime or Google Chat video call; a Teams, Zoom, or Webex voice or video interaction; a map-based communication; and/or the like. As will be recognized, determining the appropriate positive user contact may include other embodiments and combinations of those described.

In one embodiment, determining the appropriate positive user contact may include determining a preferred communications type (e.g., communications channel) for the user and/or the positive user contact. For example, the user profile data object for a user or a positive user contact may list one or more communication types/channels through which he or she is available to communicate with the user or that are most effective. The communication types/channels may include voice calls (e.g., phone numbers); FaceTime or Google Chat video calls; Teams, Zoom, or Webex voice or video interactions; map-based communications; and/or the like. The communications types may also be associated with one or more ranking options. For example, if the user and/or the positive user contact may indicate that an order in which the communications types should be attempted, such as a FaceTime video call first and followed Zoom video. In such a case, attempting to establish a communication between a user and a positive user contact may include iterating through one or more communications types before attempting to contact the next positive user contact (based at least in part on his or her communications types).

In one embodiment, the communications may be contextualized. For example, a user (e.g., operating a user computing entity 10) may enter the reason for the communication, the corresponding primary triggering event, the corresponding secondary triggering events, the location of the user, and/or the like may be provided as part of establishing the communication. Thus, the call context can be automatically presented to encourage the positive user contact to establish the communication. FIG. 10 shows an attempt to establish a communication with a user and a positive user contact via a video call. As will be recognized, the communication types/channels may include voice calls (e.g., phone numbers); FaceTime or Google Chat video calls; Teams, Zoom, or Webex voice or video interactions; and/or the like. FIG. 11 shows an attempt to establish a communication with a user and a positive user contact via a map-based communication. The map-based communication may be accompanied with a voice or video call and allow the positive user contact to navigate to the user. As will be recognized, a variety of approaches and techniques can be used to adapt to various needs and circumstances.

In one embodiment, at step/operation 516, the mobile app 600 can store an event record data object for each event for which a communication was attempted and/or established. For example, FIG. 12 shows an exemplary event record data object 1200. The event record data object 1200 can be used to store the physiological information/data, biometric information/data, accelerometer information/data, location information/data, time information/data, and/or the like associated with each event. The event record data object 1200 can be used to store various types of other information/data, such as the positive user contact with whom the communication was established, the time the communication was established, the communication type/channel, the result of triggering events (relapse, prevented, and/or the like), and/or the like.

The event record data objects 1200 can be used to track the user's progress and provide positive reinforcement, group congratulatory messages, badges, discounts, sobriety reminders and counters, and/or the like. FIG. 13 shows an instance of the mobile app 600 provide a congratulatory message for the user for being sober for 56 days. As will be recognized, a variety of approaches and techniques can be used to adapt to various needs and circumstances. For example, the features of the event record data objects can be used to create vectors for input into to one or more machine learning models. With such information/data, the one or more machine learning models can predict the best positive user contact and/or communication type for a primary triggering event and any corresponding secondary triggering events.

Technical Advantages

In various embodiments, methods, systems, apparatuses, computer program products, and/or the like are provided for automatically establishing communications between multiple users. By providing for both primary triggering events and secondary triggering events, false positive events can be greatly reduced or avoided. The reduction in false positive events reduces network traffic by only establishing communications when necessary. Further, the automated information/data collection and analysis reduces the need to use potentially unreliable external indicators of addictive activities. This also reduces network traffic and the strain on computational resources.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for automatically establishing a communication, the method comprising:
   programmatically capturing, by a first mobile user computing entity, physiological data for storage in one or more physiological data objects, wherein the physiological data stored in the one or more physiological data objects is captured by one or more physiological components of the first mobile user computing entity;
   receiving user input related to a plurality of positive user contacts;
   determining, by a mobile app executing on the first mobile user computing entity, whether the physiological data stored in the one or more physiological data objects satisfies a primary physiological threshold indicating the occurrence of a primary physiological triggering event, wherein the primary physiological triggering event is associated with a time;
   responsive to determining that the physiological data stored in the one or more physiological data objects satisfies the primary physiological threshold, identifying, by the mobile app executing on the first mobile user computing entity, at least one accelerometer data object of one or more accelerometer data objects that corresponds to the time associated with the primary physiological triggering event, wherein accelerometer data stored in the at least one accelerometer data object is captured by an accelerometer of the first mobile computing entity or a wearable computing entity worn by the user;
   determining, by the mobile app executing on the first mobile user computing entity, whether the accelerometer data stored in the at least one accelerometer data object satisfies a secondary accelerometer threshold indicating the occurrence of a secondary accelerometer triggering event;
   responsive to determining that the accelerometer data stored in the at least one accelerometer data object satisfies the secondary accelerometer threshold, automatically determining, by the mobile app executing on the first mobile user computing entity, that a first positive user contact of the plurality of positive user contacts is a first appropriate positive user contact, wherein (a) determining that the first positive user contact is the first appropriate positive user contact is based at least in part (i) on the primary physiological triggering event or the secondary accelerometer triggering event, (ii) a priority order associated with the plurality of positive user contacts, (iii) a location of the user based at least in part on location data associated with the first mobile user computing entity, (iv) a location of the first positive user contact based at least in part on location data associated with a second mobile user computing entity, and (v) an availability of the first positive user contact, and (b) each positive user contact is associated with a corresponding positive user contact data object; and
   responsive to determining that the first positive user contact is the first appropriate positive user contact, automatically initiating, by the mobile app executing on the first mobile user computing entity, a communication via a first communication type between the first mobile user computing entity of the user and the second mobile user computing entity of the first positive user contact.

2. The method of claim 1 further comprising identifying the first communication type for automatically initiating the communication between the first mobile user computing entity of the user and the second mobile user computing entity of the first positive user contact.

3. The method of claim 1 further comprising, responsive to not establishing a communication via the first communication type, automatically identifying a second communication type for automatically initiating the communication between the first mobile user computing entity of the user and the second mobile user computing entity of the first positive user contact.

4. The method of claim 1 further comprising:
   responsive to not establishing a communication via the first communication type, automatically determining that a second positive user contact of the plurality of positive user contacts is a second appropriate positive user contact; and responsive to determining that the second positive user contact is the second appropriate positive user contact, automatically initiating a communication via a second communication type between the first mobile user computing entity of the user and a third mobile user computing entity of the second positive user contact.

5. The method of claim 1 further comprising establishing the communication via the first communication type, wherein the communication is selected from the group consisting of a video call, voice call, an app communication.

6. The method of claim 1 further comprising generating and storing an event record data object comprising (a) at least a portion of the physiological data, (b) at least a portion of the accelerometer data, and (c) an indication of the first positive user contact.

7. An apparatus comprising at least one processor and at least one memory including program code, the at least one memory and the program code configured to, with the processor, cause the apparatus to at least:
   programmatically capture physiological data for storage in one or more physiological data objects, wherein (a) the physiological data stored in the one or more physiological data objects is captured by one or more physiological components of the apparatus;
   receive user input related to a plurality of positive user contacts;
   determine, by a mobile app executing on the apparatus, whether the physiological data stored in the one or more physiological data objects satisfies a primary physiological threshold indicating the occurrence of a primary physiological triggering event, wherein the primary physiological triggering event is associated with a time;
   responsive to determining that the physiological data stored in the one or more physiological data objects satisfies the primary physiological threshold, identify, by the mobile app executing on the apparatus, at least one accelerometer data object of one or more accelerometer data objects that corresponds to the time associated with the primary physiological triggering event, wherein accelerometer data stored in the at least one accelerometer data object is captured by an accelerometer of the apparatus or a wearable computing entity worn by the user;
   determine, by the mobile app executing on the apparatus, whether the accelerometer data stored in the at least one accelerometer data object satisfies a secondary accelerometer threshold indicating the occurrence of a secondary accelerometer triggering event;
   responsive to determining that the accelerometer data stored in the at least one accelerometer data object satisfies the secondary accelerometer threshold, automatically determine, by the mobile app executing on the apparatus, that a first positive user contact of the plurality of positive user contacts is a first appropriate positive user contact, wherein (a) determining that the first positive user contact is the first appropriate positive user contact is based at least in part (i) on the primary physiological triggering event or the secondary accelerometer triggering event, (ii) a priority order associated with the plurality of positive user contacts, (iii) a location of the user based at least in part on location data associated with the apparatus, (iv) a location of the first positive user contact based at least in part on location data associated with a mobile user computing entity, and (v) an availability of the first positive user contact, and (b) each positive user contact is associated with a corresponding positive user contact data object; and
   responsive to determining that the first positive user contact is the first appropriate positive user contact, automatically initiate, by the mobile app executing on the apparatus, a communication via a first communication type between the apparatus of the user and the mobile user computing entity of the first positive user contact.

8. The apparatus of claim 7, wherein the memory and program code are further configured to, with the processor, cause the apparatus to identify the first communication type for automatically initiating the communication between the apparatus of the user and the mobile user computing entity of the first positive user contact.

9. The apparatus of claim 7, wherein the memory and program code are further configured to, with the processor, cause the apparatus to, responsive to not establishing a communication via the first communication type, automatically identify a second communication type for automatically initiating the communication between the apparatus of the user and the mobile user computing entity of the first positive user contact.

10. The apparatus of claim 7, wherein the memory and program code are further configured to, with the processor, cause the apparatus to:
   responsive to not establishing a communication via the first communication type, automatically determine that a second positive user contact of the plurality of positive user contacts is a second appropriate positive user contact; and
   responsive to determining that the second positive user contact is the second appropriate positive user contact, automatically initiate a communication via a second communication type between the apparatus of the user and a second mobile user computing entity of the second positive user contact.

11. The apparatus of claim 7, wherein the memory and program code are further configured to, with the processor, cause the apparatus to establish the communication via the first communication type, wherein the communication is selected from the group consisting of a video call, voice call, an app communication.

12. The apparatus of claim 7, wherein the memory and program code are further configured to, with the processor, cause the apparatus to generate and store an event record data object comprising (a) at least a portion of the physiological data, (b) at least a portion of the accelerometer data, and (c) an indication of the first positive user contact.

13. A computer program product comprising at least one non-transitory computer-readable storage medium having computer-readable program code portions of a mobile app stored therein, when executed by an apparatus, cause the apparatus to:
   programmatically capture physiological data for storage in one or more physiological data objects, wherein (a) the physiological data stored in the one or more physiological data objects is captured by one or more physiological components of the apparatus;
   receive user input related to a plurality of positive user contacts;
   determine, by a mobile app executing on the apparatus, whether the physiological data stored in the one or more physiological data objects satisfies a primary physiological threshold indicating the occurrence of a primary physiological triggering event, wherein the primary physiological triggering event is associated with a time;

responsive to determining that the physiological data stored in the one or more physiological data objects satisfies the primary physiological threshold, identify, by the mobile app executing on the apparatus, at least one accelerometer data object of one or more accelerometer data objects that corresponds to the time associated with the primary physiological triggering event, wherein accelerometer data stored in the at least one accelerometer data object is captured by an accelerometer of the apparatus or a wearable computing entity worn by the user;

determine, by the mobile app executing on the apparatus, whether the accelerometer data stored in the at least one accelerometer data object satisfies a secondary accelerometer threshold indicating the occurrence of a secondary accelerometer triggering event;

responsive to determining that the accelerometer data stored in the at least one accelerometer data object satisfies the secondary accelerometer threshold, automatically determine, by the mobile app executing on the apparatus, that a first positive user contact of the plurality of positive user contacts is a first appropriate positive user contact, wherein (a) determining that the first positive user contact is the first appropriate positive user contact is based at least in part (i) on the primary physiological triggering event or the secondary accelerometer triggering event, (ii) a priority order associated with the plurality of positive user contacts, (iii) a location of the user based at least in part on location data associated with the apparatus, (iv) a location of the first positive user contact based at least in part on location data associated with a mobile user computing entity, and (v) an availability of the first positive user contact, and (b) each positive user contact is associated with a corresponding positive user contact data object; and responsive to determining that the first positive user contact is the first appropriate positive user contact, automatically initiate, by the mobile app executing on the apparatus, a communication via a first communication type between the apparatus of the user and the mobile user computing entity of the first positive user contact.

14. The computer program product of claim 13 the computer-readable program code portions of the mobile app stored therein, when executed by the apparatus, further cause the apparatus to identify the first communication type for automatically initiating the communication between the apparatus of the user and the mobile user computing entity of the first positive user contact.

15. The computer program product of claim 13 the computer-readable program code portions of the mobile app stored therein, when executed by the apparatus, further cause the apparatus to, responsive to not establishing a communication via the first communication type, automatically identify a second communication type for automatically initiating the communication between the apparatus of the user and the mobile user computing entity of the first positive user contact.

16. The computer program product of claim 13 the computer-readable program code portions of the mobile app stored therein, when executed by the apparatus, further cause the apparatus to:

responsive to not establishing a communication via the first communication type, automatically determine that a second positive user contact of the plurality of positive user contacts is a second appropriate positive user contact; and responsive to determining that the second positive user contact is the second appropriate positive user contact, automatically initiate a communication via a second communication type between the apparatus of the user and a second mobile user computing entity of the second positive user contact.

17. The computer program product of claim 13 the computer-readable program code portions of the mobile app stored therein, when executed by the apparatus, further cause the apparatus to establish the communication via the first communication type, wherein the communication is selected from the group consisting of a video call, voice call, an app communication.

18. The computer program product of claim 13, the computer-readable program code portions of the mobile app stored therein, when executed by the apparatus, further cause the apparatus to generate and store an event record data object comprising (a) at least a portion of the physiological data, (b) at least a portion of the accelerometer data, and (c) an indication of the first positive user contact.

* * * * *